(12) United States Patent
Kiyoto

(10) Patent No.: US 12,116,512 B2
(45) Date of Patent: Oct. 15, 2024

(54) TRANSFER FOIL FOR TOUCH SENSOR AND METHOD FOR MANUFACTURING CONDUCTIVE FILM FOR TOUCH SENSOR

(71) Applicant: FUJIFILM Corporation, Tokyo (JP)

(72) Inventor: Naoharu Kiyoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 205 days.

(21) Appl. No.: 17/473,516

(22) Filed: Sep. 13, 2021

(65) Prior Publication Data

US 2021/0403769 A1    Dec. 30, 2021

Related U.S. Application Data

(63) Continuation of application No. PCT/JP2020/009054, filed on Mar. 4, 2020.

(30) Foreign Application Priority Data

Mar. 29, 2019    (JP) .................................. 2019-068299
Jul. 25, 2019    (JP) .................................. 2019-136819

(51) Int. Cl.
  *C09J 9/02*        (2006.01)
  *B32B 7/12*        (2006.01)
  (Continued)

(52) U.S. Cl.
  CPC    *C09J 9/02* (2013.01); *B32B 7/12* (2013.01); *B32B 15/08* (2013.01); *B32B 37/025* (2013.01);
  (Continued)

(58) Field of Classification Search
  CPC ............ Y10T 428/14; Y10T 428/1424; Y10T 428/1452; Y10T 428/1462;
  (Continued)

(56) References Cited

U.S. PATENT DOCUMENTS

2013/0129465 A1    5/2013    Okazaki et al.
2013/0330546 A1    12/2013   Takami et al.
(Continued)

FOREIGN PATENT DOCUMENTS

CN    102959030 A    3/2013
JP    11-105417 A    4/1999
(Continued)

OTHER PUBLICATIONS

Machine translation (Espacenet) of JP 2013-077435 A. Translated Mar. 3, 2024. (Year: 2024).*

(Continued)

*Primary Examiner* — Maria V Ewald
*Assistant Examiner* — Ethan A. Utt
(74) *Attorney, Agent, or Firm* — Edwards Neils LLC; Jean C. Edwards, Esq.

(57) ABSTRACT

A transfer foil for a touch sensor includes a temporary support, a conductive layer, and a layer to be bonded to a support. The peel adhesion between the temporary support and the conductive layer is 0.20 N/mm or less. The layer to be bonded to a support has a thickness of 20 μm or less, and a modulus of elasticity of 0.10 MPa or more at a temperature of 130° C. The conductive layer includes a detection electrode that has a mesh pattern formed of a thin wire consisting of a conductive member and an external connection terminal that consists of a conductive member and is drawn from the detection electrode. The thin wire forming the mesh pattern of the detection electrode has a line width of 1 μm or more and 4.5 μm or less.

13 Claims, 4 Drawing Sheets

(51) Int. Cl.
  *B32B 15/08* (2006.01)
  *B32B 37/00* (2006.01)
  *C09J 5/00* (2006.01)
  *C09J 7/25* (2018.01)
  *C09J 7/38* (2018.01)
  *C09J 7/40* (2018.01)
  *G06F 3/041* (2006.01)

(52) U.S. Cl.
  CPC . *C09J 5/00* (2013.01); *C09J 7/25* (2018.01); *C09J 7/38* (2018.01); *C09J 7/405* (2018.01); *G06F 3/041* (2013.01); *B32B 2307/202* (2013.01); *B32B 2457/208* (2013.01); *C09J 2203/326* (2013.01); *C09J 2301/302* (2020.08); *C09J 2400/163* (2013.01); *C09J 2479/086* (2013.01); *G06F 2203/04103* (2013.01)

(58) Field of Classification Search
  CPC ......... Y10T 428/1471; Y10T 428/1476; Y10T 428/24273; Y10T 428/24298; Y10T 428/24306; Y10T 428/24322; Y10T 428/24331; Y10T 428/24942; Y10T 428/2495; Y10T 428/24959; Y10T 428/24967; Y10T 428/24975; Y10T 428/26; Y10T 428/263; Y10T 428/264; Y10T 428/265; Y10T 428/266; Y10T 428/269; Y10T 428/28; Y10T 428/2804; Y10T 428/2809; Y10T 428/2839; Y10T 428/2852; Y10T 428/2857; Y10T 428/2878; Y10T 428/2883; Y10T 428/2891; Y10T 428/2896; Y10T 428/31507; Y10T 428/31533; Y10T 428/31551; Y10T 428/31562; Y10T 428/31565; Y10T 428/31569; Y10T 428/31573; Y10T 428/3158; Y10T 428/31587; Y10T 428/31591; Y10T 428/31598; Y10T 428/31605; Y10T 428/31663; Y10T 428/31667; Y10T 428/31678; Y10T 428/31681; Y10T 428/31692; Y10T 428/31699; Y10T 428/31703; Y10T 428/31707; Y10T 428/31721; Y10T 428/31725; Y10T 428/31786; Y10T 428/31797; Y10T 428/31826; Y10T 428/31833; Y10T 428/31837; Y10T 428/31855; Y10T 428/3188; Y10T 428/31888; Y10T 428/31891; Y10T 428/31909; Y10T 428/31913; Y10T 428/31917; Y10T 428/3192; Y10T 428/31924; Y10T 428/31928; Y10T 428/31931; Y10T 428/31935; Y10T 428/31938; Y10T 428/31971; Y10T 428/2848; Y10T 428/3175; B32B 5/00; B32B 5/02; B32B 5/028; B32B 7/00; B32B 7/04; B32B 7/06; B32B 7/12; B32B 15/00; B32B 15/02; B32B 15/04; B32B 15/06; B32B 15/08; B32B 15/082; B32B 15/085; B32B 15/088; B32B 15/09; B32B 15/095; B32B 15/20; B32B 23/00; B32B 23/04; B32B 23/042; B32B 23/046; B32B 23/08; B32B 25/00; B32B 25/04; B32B 25/042; B32B 25/08; B32B 25/12; B32B 25/14; B32B 25/16; B32B 25/18; B32B 25/20; B32B 27/00; B32B 27/04; B32B 27/06; B32B 27/08; B32B 27/28; B32B 27/283; B32B 27/285; B32B 27/286; B32B 27/288; B32B 27/30; B32B 27/302; B32B 27/304; B32B 27/308; B32B 27/32; B32B 27/34; B32B 27/36; B32B 27/365; B32B 27/40; B32B 2305/38; B32B 2307/51; B32B 2307/748; B32B 2405/00; B32B 2457/208; C09J 7/00; C09J 7/20; C09J 7/22; C09J 7/24; C09J 7/241; C09J 7/243; C09J 7/245; C09J 7/25; C09J 7/255; C09J 7/28; C09J 7/29; C09J 7/30; C09J 7/381; C09J 7/383; C09J 7/385; C09J 7/387; C09J 7/40; C09J 7/401; C09J 7/405; C09J 7/38; G06F 3/00; G06F 3/01; G06F 3/03; G06F 3/041; G06F 3/047
  USPC ......... 428/40.1, 40.8, 41.3, 41.5, 41.7, 41.8, 428/131, 134, 135, 138, 212, 213, 214, 428/215, 216, 220, 332, 334, 335, 336, 428/337, 339, 343, 344, 345, 352, 354, 428/355 R, 356, 355 EN, 355 BL, 428/355 AC, 355 N, 412, 419, 423.1, 428/423.5, 423.9, 424.2, 424.6, 424.8, 428/425.1, 425.5, 425.8, 446, 447, 450, 428/451, 452, 457, 458, 461, 462, 463, 428/464, 465, 473.5, 474.4, 476.3, 476.9, 428/480, 483, 492, 500, 515, 517, 518, 428/519, 520, 521, 522, 523, 532, 137, 428/423.7, 516
  See application file for complete search history.

(56) References Cited

U.S. PATENT DOCUMENTS

| | | | | |
|---|---|---|---|---|
| 2016/0152002 A1* | 6/2016 | Inui | ..................... | B32B 37/12 428/172 |
| 2016/0355705 A1* | 12/2016 | Kawano | ............ | C08F 220/1811 |
| 2017/0199412 A1* | 7/2017 | Suto | ..................... | H05K 1/02 |
| 2018/0246603 A1* | 8/2018 | Yu | ..................... | G06F 3/047 |

FOREIGN PATENT DOCUMENTS

| | | | |
|---|---|---|---|
| JP | 2007-257964 A | | 10/2007 |
| JP | 2012-033466 A | | 2/2012 |
| JP | 2013-010262 A | | 1/2013 |
| JP | 2013077435 A | * | 4/2013 |
| JP | 2015-108958 A | | 6/2015 |
| KR | 20160085036 A | | 7/2016 |
| KR | 20170051188 A | * | 5/2017 |

OTHER PUBLICATIONS

International Search Report Issued in PCT/JP2020/009054 on Jun. 2, 2020.
Written Opinion Issued in PCT/JP2020/009054 on Jun. 2, 2020.
International Preliminary Report on Patentability Issued in PCT/JP2020/009054 on Sep. 28, 2021.
Office Action, issued by the State Intellectual Property Office on Nov. 3, 2022, in connection with Chinese Patent Application No. 202080020254.3.
Office Action, issued by the State Intellectual Property Office on Apr. 4, 2023, in connection with Chinese Patent Application No. 202080020254.3.

* cited by examiner

TRANSFER FOIL FOR TOUCH SENSOR AND METHOD FOR MANUFACTURING CONDUCTIVE FILM FOR TOUCH SENSOR

CROSS-REFERENCE TO RELATED APPLICATIONS

This application is a Continuation of PCT International Application No. PCT/JP2020/009054 filed on Mar. 4, 2020, which was published under PCT Article 21 (2) in Japanese, and which claims priority under 35 U.S.C. § 119 (a) to Japanese Patent Application No. 2019-068299 filed on Mar. 29, 2019, and Japanese Patent Application No. 2019-136819 filed on Jul. 25, 2019. The above applications are hereby expressly incorporated by reference, in their entirety, into the present application.

BACKGROUND OF THE INVENTION

1. Field of the Invention

The present invention relates to a transfer foil for a touch sensor for transferring a conductive layer to a support and a method for manufacturing a conductive film for a touch sensor by using the transfer foil for a touch sensor.

2. Description of the Related Art

In recent years, a touch sensor has become widespread which is used by being incorporated into a display device, such as a liquid crystal display device, in various electronic apparatuses including mobile information apparatuses, such as a tablet computer and a smartphone, so as to enable a user to perform an input operation on the electronic apparatuses by touching a screen with a finger or a stylus pen or by moving a finger or a stylus pen close to the screen.

A touch sensor usually composes a detection electrode for detecting a touch operation performed by a finger, a stylus pen, or the like. For the detection electrode, a conductive member, such as an ITO (Indium Tin Oxide) thin film or a fine metal wire having a mesh-shaped wiring pattern or the like, is used. It is known that higher conductivity and higher flexibility are more easily obtained in a case where a fine metal wire is used as the conductive member than in a case where ITO is used as the conductive member.

Furthermore, for example, as disclosed in JP2013-10262A, a method is known in which a conductive film for a touch sensor consisting of a support and a conductive layer disposed thereon is manufactured by a so-called transfer method that is a method of bonding a transfer foil having a temporary support and a detection electrode formed thereon to a support and then peeling off the temporary support.

SUMMARY OF THE INVENTION

Incidentally, in recent years, the development of a so-called flexible display that is bendable has been actively carried out, and there has been a demand for development of a touch sensor which is disposed on the flexible display and capable of bending along with the flexible display. In order for a touch sensor to bend along with the flexible display, it is desirable that the touch sensor is thin. However, in a case where a thin support is used as a support, for example, for holding a detection electrode so as to make a thin touch sensor, unfortunately, it is difficult to handle the support in forming the detection electrode on the support and to stably form the detection electrode on the support.

Therefore, the inventors of the present invention tried to manufacture a conductive film for a touch sensor including a thin support aid a detection electrode disposed thereon, by a method of bonding a transfer foil, which includes a temporary support thick enough for stably forming a detection electrode and a detection electrode consisting of a fine metal wire formed on the temporary support, to a thin support and then peeling off the temporary support. However, with the transfer technique of the related art disclosed in JP2013-10262A, in a case where an attempt is made to transfer the detection electrode to the support, unfortunately, sometimes the fine metal wire forming the detection electrode is peeled off together with the temporary support, and the detection electrode is easily broken accordingly.

Usually, in order to connect the detection electrode to an external device, a so-called lead wire is drawn from the detection electrode. The lead wire is connected to an external connection terminal and often connected to a so-called flexible print substrate by thermocompression at the external connection terminal in a conductive film for a touch sensor in which a defection electrode, a lead wire, and an external connection terminal are arranged on a thin support, in a ease where the external connection terminal and a flexible print substrate are connected to each other by thermocompression, sometimes the support bends, and the external connection terminal is excessively displaced in the lamination direction of the conductive film and cracks accordingly. As a result, unfortunately, the external connection terminal is broken.

The present invention has been made to solve the above problems. An object of the present invention is to provide a transfer foil for a touch sensor making it possible to form a conductive film which can prevent the breaking of a detection electrode in a case where an attempt is made to transfer the detection electrode to a support, has flexibility, and can prevent the breaking of an external connection terminal in a case where the external connection terminal and a flexible print substrate are connected to each other by thermocompression.

Another object of the present invention is to provide a method for manufacturing a conductive film for a touch sensor by using the transfer foil for a touch sensor.

A first transfer foil for a touch sensor according to an embodiment of the present invention is a transfer foil for a touch sensor for transferring a conductive layer to a support. The transfer foil for a touch sensor comprises a temporary support a conductive layer that is disposed on a surface of the temporary support, and a layer to be bonded to a support that is disposed on a surface of the conductive layer and consists of a pressure-sensitive adhesive layer or a curable adhesive layer, in which a peel adhesion between the temporary support and the conductive layer is 0.20 N/mm or less, the layer to be bonded to a support has a thickness of 20 μm or less and a modulus of elasticity of 0.10 MPa or more at a temperature of 130° C., the conductive layer includes a detection electrode that has a mesh pattern formed of a thin wire consisting of a conductive member, a lead wire that consists of a conductive member and is drawn from the detection electrode, and an external connection terminal that is connected to the lead wire and the thin wire forming the mesh pattern of the detection electrode has a line width of 1.0 μm or more and 4.5 μm or less.

A second transfer foil for a touch sensor according to an embodiment of the present invention is a transfer foil for a touch sensor for transferring a conductive layer to a support. The transfer foil for a touch sensor comprises a temporary support, a conductive layer that is disposed on a surface of the temporary support, and a layer to be bonded to a support that has a curable adhesive layer disposed on a surface of the conductive layer and a pressure-sensitive adhesive layer disposed on the curable adhesive layer, in which a peel adhesion between the temporary support and the conductive layer is 0.20 N/mm or less, the pressure-sensitive adhesive layer and the curable adhesive layer each have a thickness of 20 µm or less, the layer to be bonded to a support has a modulus of elasticity of 0.10 MPa or more at a temperature of 130° C., the conductive layer includes a detection electrode that has a mesh pattern formed of a thin wire consisting of a conductive member, a lead wire that consists of a conductive member and is drawn from the detection electrode, and an external connection terminal that is connected to the lead wire, and the thin wire forming the mesh pattern of the detection electrode has a line width of 1.0 µm or more and 4.5 µm or less.

The layer to be bonded to a support more preferably has a modulus of elasticity of 0.15 MPa or more at a temperature of 130° C. and even more preferably hits a modulus of elasticity of 0.20 MPa or more at a temperature of 130° C.

Furthermore, a rubber content in the layer to be bonded to a support is preferably 15% by mass or more and 45% by mass or less.

Each of the first and second transfer foils for a touch sensor further comprises a support layer disposed on a surface of the layer to be bonded to a support. It is preferable that the support layer has a polyimide resin.

In this case, it is preferable that each of the first and second transfer foils for a touch sensor further comprise a hardcoat layer disposed on a surface of the support, the support being opposite to the layer to be bonded to a support.

It is preferable that the conductive member include a conductive material and a resin material.

The conductive material of the conductive member is preferably a metal material.

More specifically, the conductive material of the conductive member is preferably silver.

Furthermore, in the conductive member, a mass ratio of the resin material to the conductive material is preferably 0.01 or more.

The method for manufacturing a conductive film for a touch sensor according to an embodiment of the present invention is a method of bonding the layer to be bonded to a support in the aforementioned transfer foil for a touch sensor to a surface of a support and peeling the temporary support from the conductive layer.

According to the transfer foil for a touch sensor of an embodiment of the present invention, the peel adhesion between the temporary support and the conductive layer is 0.20 N/mm or less, the layer to be bonded to a support has a thickness of 20 µm or less and a modulus of elasticity of 0.10 MPa or more at a temperature of 130° C., the conductive layer includes a detection electrode that has a mesh pattern formed of a thin wire consisting of a conductive member, a lead wire that consists of a conductive member and is drawn from the detection electrode, and an external connection terminal that is connected to the lead wire, and the thin wire forming the mesh pattern of the detection electrode has a line width of 1.0 µm or more and 4.5 µm or less. Therefore, the transfer foil for a touch sensor makes it possible to form a conductive film for a touch sensor which can prevent the breaking of a detection electrode in a case where an attempt is made to transfer the detection electrode to a support, has flexibility, and can prevent the breaking of an external connection terminal in a case where the external connection terminal and a flexible print substrate are connected to each other by thermocompression.

DESCRIPTION OF THE PREFERRED EMBODIMENTS

Hereinafter, the touch panel according to an embodiment of the present invention will be specifically described based on preferred embodiments shown in the accompanying drawings.

Unless otherwise specified, angles described using "orthogonal", "parallel", and the like include error ranges generally accepted in the technical field.

"Transparent" means that in a visible light wavelength range of 0.4 µm or more and 0.8 µm or less, a transmittance is at least 40% or more, preferably 75% or more, more preferably 80% or more, and even more preferably 90% or more. The transmittance is measured using "Plastics—Determination of total luminous transmittance and reflectance" specified in JIS K 7375:2008.

In the present specification, a range of numerical values described using "to" means a range including numerical values listed before and after "to" as a lower limit and an upper limit.

First Embodiment

Figure 1:
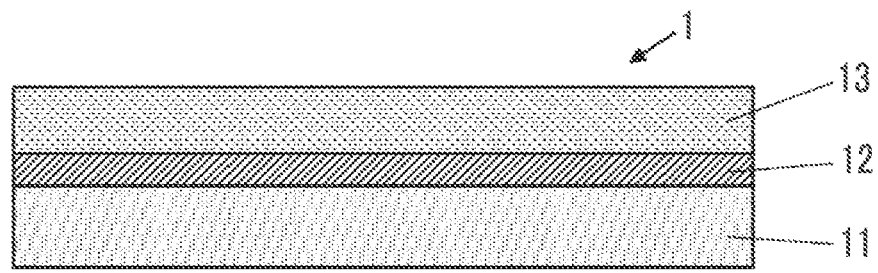
FIG. 1 is a cross-sectional view schematically showing a transfer foil for a touch sensor according to a first embodiment of the present invention.

FIG. 1 shows a transfer foil 1 for a touch sensor according to a first embodiment of the present invention. The transfer foil 1 for a touch sensor has a temporary support 11, a conductive layer 12 disposed on a surface of the temporary support 11, and a layer 13 to be bonded to a support that is disposed on a surface of the conductive layer 12.

Figure 2:
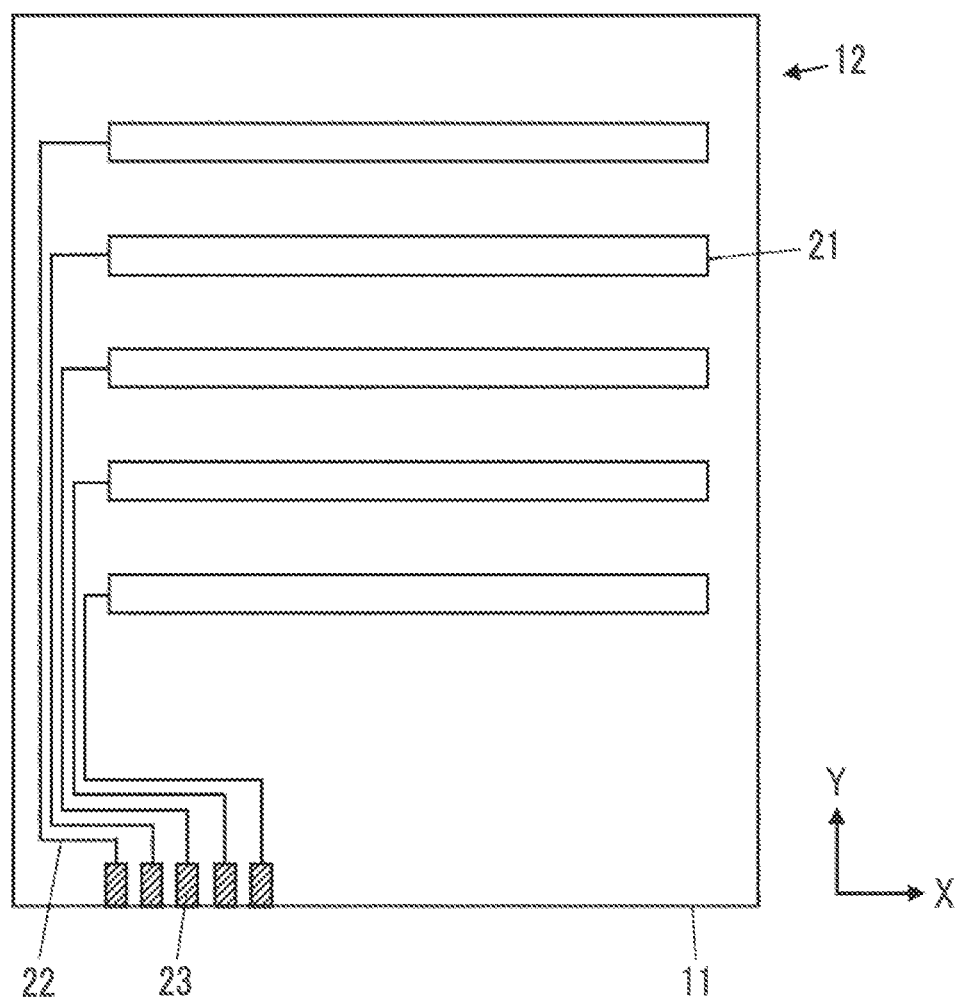
FIG. 2 is a plan view of a conductive layer according to the first embodiment of the present invention.

As shown in FIG. 2, the conductive layer 12 has a plurality of first detection electrodes 21 formed on a surface of the temporary support 11, and a plurality of first lead wires 22 drawn from the end portions of the plurality of first detection electrodes 21. The plurality of first detection electrodes 21 extend in the X direction and are arranged in the Y direction perpendicular to the X direction. The plurality of first lead wires 22 extend to the end portions of the temporary support 11 in the −Y direction. At the end portions of the plurality of first lead wires 22 on the opposite side of the plurality of first detection electrodes 21, first external connection terminals 23 to be connected to an external apparatus are formed.

The plurality of first detection electrodes 21 is electrodes for detecting a touch operation that a user performs using a finger, a stylus pen, or the like.

Figure 3:
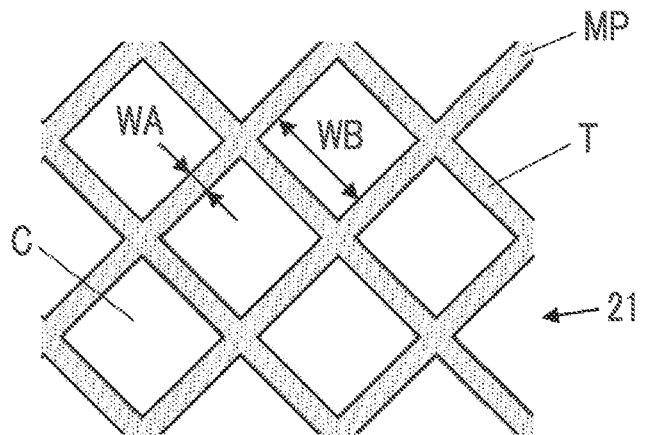
FIG. 3 is a partial plan view of a detection electrode according to the Fust embodiment of the present invention.

As shown in FIG. 3, the first detection electrodes 21 each have a mesh pattern MP formed of a thin wire T that has a certain line width WA and consists of a conductive member in the example shown in FIG. 3, the mesh pattern MP is a lattice pattern formed of a plurality of thin wires T that is arranged in two directions orthogonal to each other at a certain interval WB The mesh pattern MP is constituted with a plurality of square mesh cells C. Herein, each mesh cell C is one unit region constituting the mesh shape.

Generally, the detection electrode used in a touch sensor detecting a touch operation that a user performs using a finger, a stylus pen, or the like is often formed of an Indium Tin Oxide (ITO) thin film, thin wires consisting of a metal, and the like. It is known that higher conductivity and higher flexibility are obtained in a case where the detection electrode is formed of thin wires consisting of a metal than in a case where the detection electrode is formed of ITO. The conductive member of the thin wire T forming the first detection electrodes 21 includes a conductive material and a resin material. The thin wire T forming the first detection electrodes 21 has higher flexibility compared to a thin wire formed of only a conductive material.

In order to secure sufficient conductivity in the first detection electrodes 21 and to achieve both the touch sensitivity find flexibility, the mass ratio of the resin material to the conductive material in the conductive member of the thin wire T is preferably 0.01 or more, more preferably 0.03 or more, even more preferably 0.05 or more, particularly preferably 0.08 or more, and most preferably 0.13 or more. The upper limit of the mass ratio is not particularly limited, but is preferably 0.5 or less. It is preferable to use silver as the conductive material of the conductive member. In a case where the first detection electrodes 21 are constituted as above, even though the first detection electrodes 21 are arranged on a so-called flexible display that is bendable, and the flexible display bends, the first detection electrodes 21 can bend along with the flexible display without being broken.

The first lead wires 22 drawn from the first detection electrodes 21 are formed of the same conductive member as the first detection electrodes 21, so that conductivity and flexibility are ensured.

A line width WA of the thin wire T is 1.0 μm or more and 4.5 μm or less. In a case where WA is in this range, it is possible to ensure conductivity of the first detection electrodes 21 and to prevent the thin wire T from being visible to a user.

The thickness of the thin wire T is not particularly limited, but is preferably 0.01 μm or more and 20 μm or less, more preferably 0.01 μm or more and 10 μm or less, even more preferably 0.01 μm or more find 5 μm or less, and particularly preferably 0.5 μm or more and 2 μm or less. In a case where the thickness of the thin wire T is within this range, it is possible to sufficiently ensure conductivity of the thin wire T and to sufficiently ensure visibility.

The layer 13 to be bonded to a support is disposed on a surface of the conductive layer 12 and consists of a pressure-sensitive adhesive layer or a curable adhesive layer. The layer 13 to be bonded to a support is used for bonding the transfer foil 1 for a touch sensor to a support not shown in the drawing. For example, in a state of being disposed between the conductive layer 12 and a support not shown in the drawing, the pressure-sensitive adhesive layer keeps the conductive layer 12 and a support bonded to each other in a case where pressure is applied to the lamination direction of the conductive layer 12, the pressure-sensitive adhesive layer, and the support. Furthermore, for example, in a state of being disposed between the conductive layer 12 and a support not shown in the drawing, the curable adhesive layer causes the conductive layer 12 and a support to be stuck to each other by being cured in response to beat, light, moisture, or the like In a case where the layer 13 to be bonded to a support consists of a curable adhesive layer, a curable adhesive layer not yet being cured is used.

In order to ensure flexibility, the layer 13 to be bonded to a support has a thickness of 20 μm or less. It is preferable that the layer 13 to be bonded to a support have a thickness of 5 μm or less. The lower limit of the thickness is not particularly limited, but is preferably 0.1 μm or more, and more preferably 0.5 μm or more. Having a thickness of 20 μm or less, the layer 13 to be bonded to a support has flexibility. However, in a case where the layer 13 to be bonded to a support is too thin, the layer 13 to be bonded to a support may not conform to the step of the conductive layer 12, and the adhesiveness between the layer 13 to be bonded to a support and the conductive layer 12 mas deteriorate. At this time, in a case where an attempt is made to peel the temporary support 11 from the conductive layer 12, sometimes a part of the conductive layer 12 that exhibits low adhesiveness to the layer 13 to be bonded to a support may remain bonded to the temporary support 11 and cannot be peeled from the temporary support 11.

Generally, an external connection terminal drawn from a detection electrode of a touch sensor is often connected to a so-called flexible print substrate by using a thermocompression method under the temperature condition of about 130° C. At this time, in a case where the layer 13 to be bonded to a support has a low modulus of elasticity under a high-temperature condition, and the plurality of first external connection terminals 23 shown in FIG. 2 is connected to a flexible print substrate by thermocompression, due to the great displacement of the layer 13 to be bonded to a support, the plurality of first external connection terminals 23 of the conductive layer 12 may be greatly displaced in the lamination direction of the conductive layer 12 and the layer 13 to be bonded to a support, and the plurality of first external connection terminals 23 may be broken.

Therefore, the layer 13 to be bonded to a support has a modulus of elasticity of 0.10 MPa or more at a temperature of 130° C., more preferably has a modulus of elasticity of 0.15 MPa or more at a temperature of 130° C., and even more preferably has a modulus of elasticity of 0.20 MPa or more at a temperature of 130° C. In a case where the modulus of elasticity of the layer 13 to be bonded to a support is within the above range at a temperature of 130° C., even though the plurality of first external connection terminals 23 is connected to a flexible print substrate by using a thermocompression method, the displacement of the layer 13 to be bonded to a support is inhibited. As a result, it is possible to prevent the plurality of first external connection terminals 23 from being broken by being greatly displaced in the lamination direction of the conductive layer 12 and the layer 13 to be bonded to a support. In a case where the layer 13 to be bonded to a support consists of a curable adhesive layer, a modulus of elasticity that the curable adhesive layer having been subjected to curing has at a temperature of 130° C. is 0.10 MPa or more, more preferably 0.15 MPa or more, and even more preferably 0.20 MPa or more.

The upper limit of the modulus of elasticity is not particularly limited, but is preferably 10.0 MPa or less.

In the layer 13 to be bonded to a support, the content of rubber with respect to, for example, the total mass of the layer 13 to be bonded to a support is preferably 15% by mass or more and 45% by mass or less, more preferably 15% by mass or more and 40% by mass or less, and even more preferably 20% by mass or more and 35% by mass or less. In a case where the rubber content is with in the above range, it is possible to impart flexibility to the layer 13 to be bonded to a support and to increase the modulus of elasticity of the layer 13 to be bonded to a support at a high temperature.

The temporary support 11 functions as a support member in forming the conductive layer 12, and is peeled from the conductive layer 12 after the layer 13 to be bonded to a support is bonded to a support not shown in the drawing. In order that the occurrence of peeling between a support not shown in the drawing and the layer 13 to be bonded to a support and the occurrence of peeling between the conductive layer 12 and the layer 13 to be bonded to a support are prevented in the process of peeling the temporary support 11 from the conductive layer 12, the peel adhesion between the temporary support 11 and the conductive layer 12 is lower than the pressure-sensitive adhesion or adhesion between the layer 13 to be bonded to a support and the support not shown in the drawing and lower than the pressure-sensitive adhesion or adhesion between the conductive layer 12 and the layer 13 to be bonded to a support In a case where the peel adhesion between the temporary support 11 and the conductive layer 12 is high, when an attempt is made to peel the temporary support 11 from the conductive layer 12, a part of the conductive layer 12 may remain bonded to the temporary support 11 and cannot be peeled from the temporary support 11, and the plurality of first detection electrodes 21 formed on the conductive layer 12 may be broken In the transfer foil 1 for a touch sensor according to an embodiment of the present invention, the peel adhesion between the temporary support 11 and the conductive layer 12 is low enough, which is 0.20 N/mm or less. Therefore, in a case where an attempt is made to peel the temporary support 11 from the conductive layer 12, it is possible to prevent the breaking of the plurality of first detection electrodes 21. In view of preventing the breaking of the plurality of first detection electrodes 21, the peel adhesion between the temporary support 1 and the conductive layer 12 is preferably 0.16 N/mm or less, more preferably 0.07 N/mm or less, find even more preferably 0.03 N/mm or less. The lower limit of the peel adhesion is not particularly limited, but is preferably 0.001 N/mm or more.

Next, a method for manufacturing a conductive film for a touch sensor, the conductive film for a touch sensor to be incorporated into a touch sensor not shown in the drawing, by using the transfer foil 1 for a touch sensor according to the first embodiment of the present invention will be described.

Figure 4:
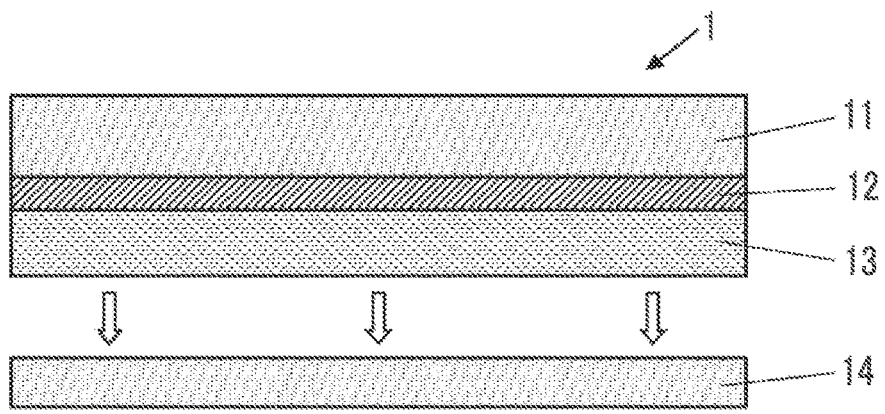
FIG. 4 is a cross-sectional view schematically showing the way the transfer foil for a touch sensor according to the first embodiment of the present invention is bonded to a support.

First, as shown in FIG. 4, the transfer foil 1 for a touch sensor is disposed so that the layer 13 to be bonded to a support and a support 14 face each other. The support 14 is thinner than the temporary support 11 and has flexibility.

Figure 5:
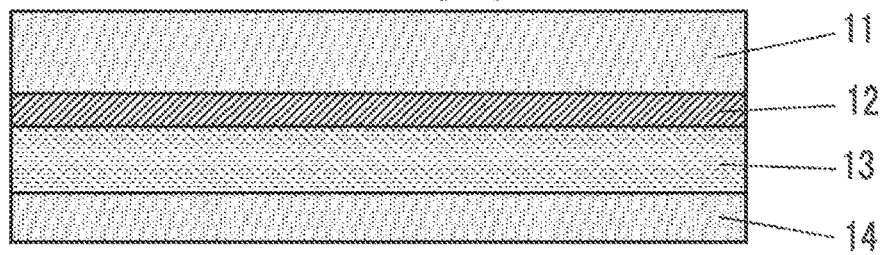
FIG. 5 is a cross-sectional view schematically showing a laminate formed by bonding the transfer foil for a touch sensor according to the first embodiment of the present invention to a support.

In a state where the transfer foil 1 for a touch sensor is disposed as described above, the layer 13 to be bonded to a support is bonded to the support 14 as shown in FIG. 5. In a case where the layer 13 to be bonded to a support consists of a pressure-sensitive adhesive layer, pressure is applied to the laminate consisting of the temporary support 11, the conductive layer 12, the layer 13 to be bonded to a support, and the support 14 in the lamination direction of the laminate, so that the layer 13 to be bonded to a support and the support 14 remain bonded to each other. In a case where the layer 13 to be bonded to a support consists of a curable adhesive layer, the layer 13 to be bonded to a support is cured in a slate where the layer 13 to be bonded to a support and the support 14 are in contact with each other, so that the conductive layer 12 and the layer 13 to be bonded to a support are stuck to each other, and the layer 13 to be bonded to a support and the support 14 are stuck to each other.

Figure 6:
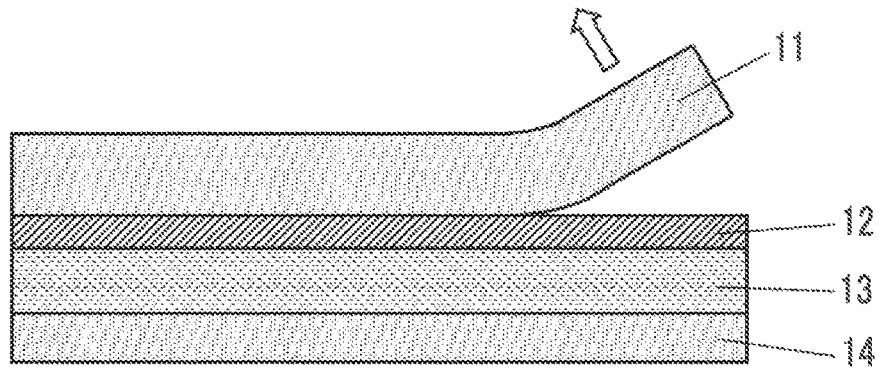
FIG. 6 is a cross-sectional view schematically showing the way the temporary support is peeled from the laminate which is formed by bonding the transfer foil for a touch sensor to a support in the first embodiment of the present invention.

In a state where the layer 13 to be bonded to a support and the support 14 are bonded to each other, the temporary support 11 is peeled from the conductive layer 12 as shown in FIG. 6. The peel adhesion between the temporary support 11 and the conductive layer 12 is low enough, which is 0.20 N/mm or less. Therefore, the temporary support 11 can be easily peeled from the conductive layer 12. Accordingly, in a case where an attempt is made to peel the temporary support 11 from the conductive layer 12, it is possible to prevent the plurality of first detection electrodes 21 from being broken due to an incident in which a part of the conductive layer 12 remains bonded to the temporary support 11 and cannot be peeled from the temporary support 11.

Figure 7:
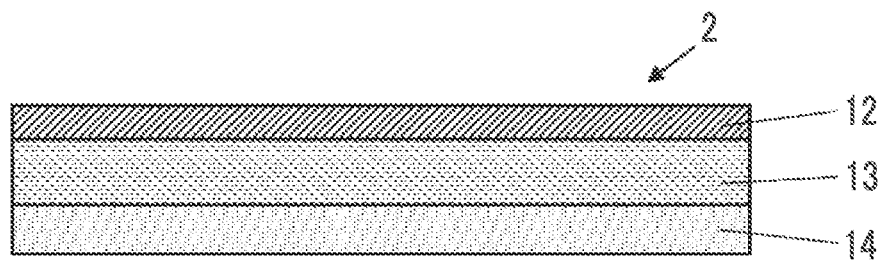
FIG. 7 is a cross-sectional view schematically showing a conductive film for a touch sensor according to the first embodiment of the present invention.

By peeling the temporary support 11 from the conductive layer 12, it is possible to obtain a conductive film 2 for a touch sensor in which the layer 13 to be bonded to a support is disposed on a surface of the support 14, and the conductive layer 12 is disposed on a surface of the layer 13 to be bonded to a support, as shown in FIG. 7. In a case where the layer 13 to be bonded to a support consists of a curable adhesive layer, the layer 13 to be bonded to a support in the conductive film 2 for a touch sensor is present as a cured layer.

Furthermore, by a thermocompression method, the plurality of first external connection terminals 23 included in the conductive layer 12 is connected to a flexible print substrate not shown in the drawing, and the conductive film 2 for a touch sensor is electrically connected to an external apparatus not shown in the drawing. The layer 13 to be bonded to a support has a high modulus of elasticity at a high temperature, for example, a modulus of elasticity of 0.10 MPa or more at 130° C. Therefore, even though the conductive film 2 for a touch sensor is pressed in the lamination direction of the conductive layer 12, the layer 13 to be bonded to a support, and the support 14 during thermocompression, the conductive layer 12 is inhibited from being, displaced in the lamination direction, which makes it possible to prevent the breaking of the plurality of first external connection terminals 23 in the conductive layer 12. In a case where the layer 13 to be bonded to a support consists of a curable adhesive layer, the modulus of elasticity thereof at 130° C. refers to a modulus of elasticity that the curable adhesive layer having undergone curing has at 130° C.

The conductive film 2 for a touch sensor manufactured as above is constituted with the conductive layer 12, the layer 13 to be bonded to a support, and the support 14 that each have flexibility. Therefore, for example, even though the conductive film 2 for a touch sensor is disposed cm a flexible display not shown in the drawing, and the flexible display bends, the conductive film 2 for a touch sensor can bend along with the flexible display, and the plurality of first detection electrodes 21 and the plurality of first external connection terminals 23 included in the conductive layer 12 are also prevented from being broken.

According to the transfer foil 1 for a touch sensor of the first embodiment of the present invention, the peel adhesion between the temporary support 11 and the conductive layer 12 is low enough, which is 0.20 N/mm or less. Therefore, in a case where an attempt is made to peel the temporary support 11 from the conductive layer 12, the plurality of first detection electrodes 21, the plurality of first lead wires 22, and the plurality of first external connection terminals 23 are prevented from being broken due to an incident in which a pan of the conductive layer 12 remains bonded to the temporary support 11 and cannot be peeled from the temporary support 11. Furthermore, the layer 13 to be bonded to a support has a modulus of elasticity of 0.10 MPa or more at a temperature of 130° C. Therefore, in the conductive film 2 for a touch sensor formed using the transfer foil 1 for a touch sensor, in a case where the plurality of first external connection terminals 23 is connected to a flexible print substrate not shown in the draw ng by a thermocompression method, the displacement of the layer 13 to be bonded to a support is inhibited, which prevents the occurrence of an incident in which the support 14 disposed on the layer 13 to be bonded to a support bends and causes the plurality of first external connection terminals 23 to be excessively displaced in the lamination direction of the conductive film 2 for a touch sensor. As a result, in a case where the plurality of first external connection terminals 23 in the conductive film 2 for a touch sensor is connected to a flexible print substrate by a thermocompression method, the cracking and breaking of the plurality of first external connection terminals 23 is prevented.

In the example shown in FIG. 3, the mesh pattern MP of the first detection electrodes 21 is constituted with square mesh cells C. However, the shape of the mesh cells C is not limited to a square.

For example, the plurality of mesh cells included in the first detection electrodes 21 can be in the shape of a rhombus other than a square, a parallelogram, an equilateral triangle, a regular hexagon, and other polygons.

Figure 8:
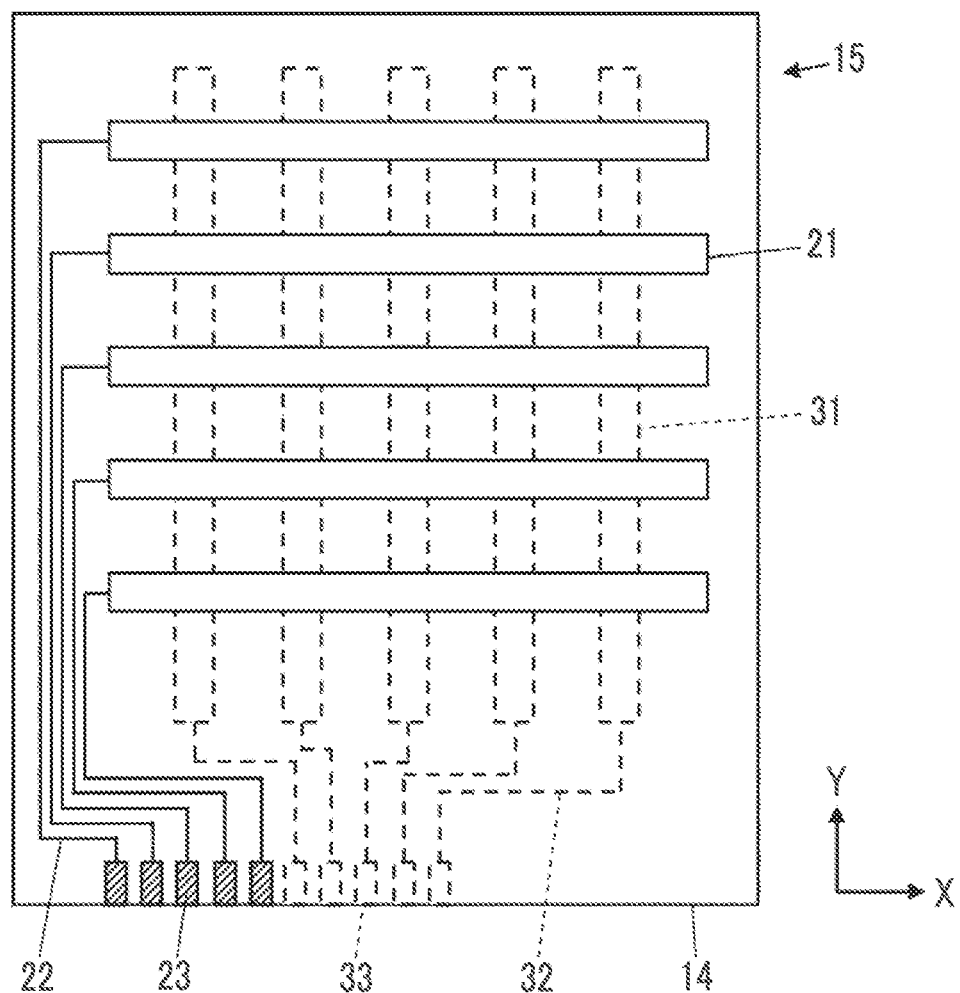
FIG. 8 is a plan view of a touch panel constituted with the transfer foil for a touch sensor according to the first embodiment of the present invention.

A touch sensor 15 shown in FIG. 8 can be constituted with the transfer foil 1 for a touch sensor according to the first embodiment of the present invention. In the touch sensor 15, the conductive layer 12 having the plurality of first detection electrodes 21 and the plurality of first lead wires 22 is disposed on the front side of the support 14, and another conductive layer having a plurality of second detection electrodes 31 and a plurality of second lead wires 32 is disposed on the back side of the support 14.

The plurality of second detection electrodes 31 extends in the Y direction and is arranged in the X direction. The plurality of second lead wires 32 extends to the end portions of the support 14 in the −Y direction. At the end portions of the plurality of second lead wires 32 on the opposite side of the plurality of second detection electrodes 31, second external connection terminals 33 to be connected to an external apparatus are formed. The plurality of second detection electrodes 31 and the plurality of first detection electrodes 21 are both electrodes for detecting a touch operation that a user performs using a finger, a stylus pen, or the like, and are arranged to intersect with the plurality of first detection electrodes 21.

In addition, the plurality of second detection electrodes 31 is formed of the thin wire T consisting of a conductive member as shown in FIG. 3, and has the same mesh pattern MP as the plurality of first detection electrodes 21.

The touch sensor 15 is manufactured using the transfer foil 1 for a touch sensor (also called a first transfer foil for a touch sensor), in which the conductive layer 12 including the plurality of first detection electrodes 21 and the plurality of first lead wires 22 is disposed on a surface of the temporal support 11 and the layer 13 to be bonded to a support is disposed on a surface of the conductive layer 12, and a transfer foil for a touch sensor (also called a second transfer foil for a touch sensor) in which the conductive layer including the plurality of second detection electrodes 31 and the plurality of second lead wires 32 is disposed on a surface of the temporary support and the layer to be bonded to a support is disposed on a surface of the conductive layer as in the transfer foil 1 for a touch sensor. More specifically, the touch sensor 15 can be manufactured by bonding the layer 13 to be bonded to a support of the first transfer foil for a touch sensor and the layer to be bonded to a support of the second transfer (oil for a touch sensor to the front surface and back surface of the support 14 respectively, and peeling the temporary support 11 of the first transfer foil for a touch sensor and the temporary support of the second transfer foil for a touch sensor.

The conductive laver 12 of the transfer foil 1 for a touch sensor shown in FIG. 1 has the plurality of first detection electrodes 21 and the plurality of first lead wires 22. However, instead of the conductive layer 12, a conductive layer, not shown in the drawing, having a laminated structure may be used in which the plurality of first detection electrodes 21 and the plurality of first lead wires 22 are formed on the front surface of a transparent insulating film, and the plurality of second detection electrodes 31 and the plurality of second lead wires 32 are formed on the back surface of the insulating film. In this case, by bonding the layer 13 to be bonded to a support of the transfer foil 1 for a touch sensor to a surface of the support 14 and peeling the temporary support 11 from the conductive layer having a laminated structure, it is possible to manufacture the conductive film 2 for a touch sensor as a touch sensor.

Second Embodiment

Figure 9:
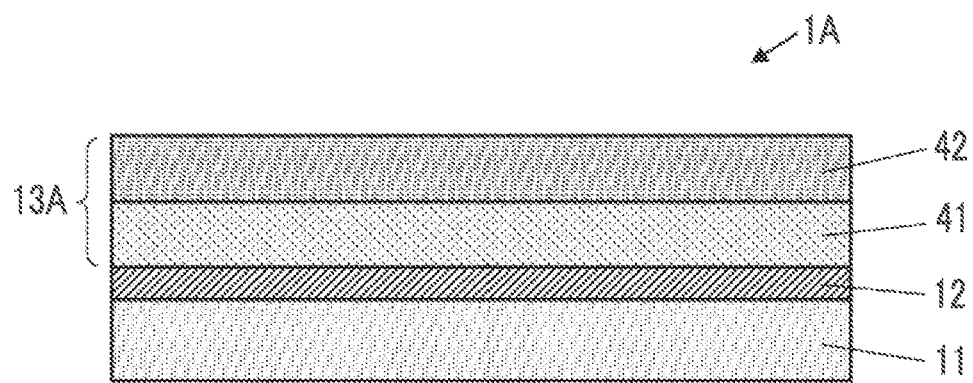
FIG. 9 is a cross-sectional view schematically showing a transfer foil for a touch sensor according to a second embodiment of the present invention.

As described above, the layer 13 to be bonded to a support in the first embodiment of the present invention consists of a pressure-sensitive adhesive layer or a curable adhesive layer. However, the layer 13 to be bonded to a support can comprise both the pressure-sensitive adhesive layer and curable adhesive layer. As shown in FIG. 9, a transfer foil 1A for a touch sensor according to a second embodiment of the present invention comprises a layer 13A to be bonded to a support, instead of the layer 13 to be bonded to a support in the transfer foil 1 for a touch sensor according to the first embodiment of the present invention. The layer 13A to be bonded to a support in the second embodiment has a curable adhesive layer 41 disposed on a surface of the conductive layer 12, and a pressure-sensitive adhesive layer 42 disposed on the curable adhesive layer 41.

In order to ensure flexibility of the layer 13A to be bonded to a support, the curable adhesive layer 41 and the pressure-sensitive adhesive layer 42 each have a thickness of 20 μm or less, it is preferable that the curable adhesive layer 41 and the pressure-sensitive adhesive layer 42 have a thickness of 5 µm or less. The lower limit of the thickness of each of the curable adhesive layer 41 and the pressure-sensitive adhesive layer 42 is not particularly limited, but is preferably 0.1 µm or more, and more preferably 0.5 µm or more Having a thickness of 20 µm or less, each of the curable adhesive layer 41 and the pressure-sensitive adhesive layer 42 has flexibility. However, in a case where the curable adhesive layer 41 and the pressure-sensitive adhesive layer 42 are too thin, the layer 13A to be bonded to a support may be unable to conform to the step of lire conductive layer 12, and the adhesiveness between the layer 13A to be bonded to a support and the conductive layer 12 may deteriorate In this state, in a case where an attempt is made to peel the temporary support 11 from the conductive layer 12, sometimes a part of the conductive layer 12 where the adhesiveness to the layer 13A to be bonded to a support is low may remain bonded to the temporary support 11 and cannot be peeled from the temporary support 11.

In the layer 13A to be bonded to a support, the modulus of elasticity that the curable adhesive layer having undergone curing has at a temperature of 130° C. is 0.10 MPa or more, more preferably 0.15 MPa or more, and even more preferably 0.20 MPa or more. In a case were the modulus of elasticity of the layer 13A to be bonded to a support is within the above range at a temperature of 130° C., even though the plurality of first external connection terminals 23 is connected to a flexible print substrate by a thermocompression method, the displacement of the layer 13A to be bonded to a support is inhibited. As a result, it is possible to prevent the plurality of first external connection terminals 23 from being greatly displaced in the lamination direction of the conductive layer 12 and the layer 13A to be bonded to a support and from being broken.

The upper limit of the modulus of elasticity is not particularly limited, but is preferably 10.0 MPa or less.

Furthermore, in the layer 13A to be bonded to a support, for example, the content of rubber with respect to the total mass of the layer 13A to be bonded to a support is preferably 15% by mass or more and 45% by mass or less, more preferably 15% by mass or more and 40% by mass or less, and even more preferably 20% by mass or more and 35% by mass or less, as in the layer 13 to be bonded to a support in the first embodiment In a case where the rubber content is within the above range, it is possible to impart flexibility to the layer 13A to be bonded to a support and to increase the modulus of elasticity of the layer 13A to be bonded to a support at a high temperature.

Next, a method for manufacturing a conductive film for a touch sensor, the conductive film to be incorporated into a touch sensor not shown in the drawing, by using the transfer foil 1A for a touch sensor according to the second embodiment will be described.

First, the transfer foil 1A for a touch sensor is disposed so that the pressure-sensitive adhesive layer 42 of the layer 13A to be bonded to a support and the support 14 face each other.

In a state where the transfer foil 1A for a touch sensor is disposed as above, the pressure-sensitive adhesive layer 42 of the layer 13A to be bonded to a support is bonded to the support 14. Furthermore, pressure is applied to a laminate consisting of the temporary 1 support 11, the conductive layer 12, the layer 13A to be bonded to a support, and the support 14 in the lamination direction of the laminate, and then the curable adhesive layer 41 in the layer 13A to be bonded to a support is cured, so that the conductive layer 12 and the curable adhesive layer 41 of the layer 13A to be bonded to a support remain bonded to each other, and that the pressure-sensitive adhesive layer 42 and the support 14 remain bonded to each other.

In a state where the layer 13A to be bonded to a support and the support 14 remain bonded to each other as described above, the temporary support 11 is peeled from the conductive layer 12. The peel adhesion between the temporary support 11 and the conductive layer 12 is loss enough, which is 0.20 N/mm or less. Therefore, the temporary support 11 can be easily peeled from the conductive layer 12. Accordingly, in a case where an attempt is made to peel the temporary support 11 from the conductive layer 12, the plurality of first detection electrodes 21, the plurality of first lead wires 22, and the plurality of first external connection terminals 23 are prevented from being broken due to an incident in which a part of the conductive layer 12 remain bonded to the temporary support 11 and cannot be peeled from the temporary support 11.

Figure 10:
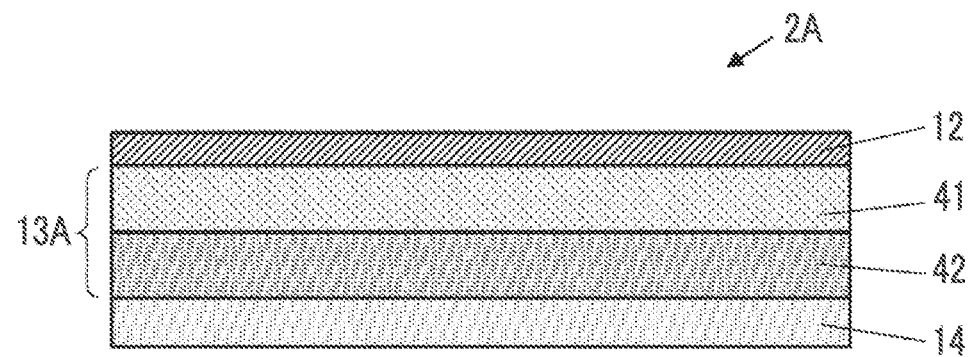
FIG. 10 is a cross-sectional view schematically showing a conductive film for a touch sensor according to the second embodiment of the present invention.

By peeling the temporary support 11 from the conductive layer 12, it is possible to obtain a conductive film 2A for a touch sensor shown in FIG. 10 in which the layer 13A to be bonded to a support is disposed on a surface of the support 14, and the conductive layer 12 is disposed on a surface of the layer 13A to be bonded to a support. In the conductive film 2 for a touch sensor, the curable adhesive layer 41 of the layer 13A to be bonded to a support is present as a cured layer.

Furthermore, by a thermocompression method, the plurality of first external connection terminals 23 included in the conductive layer 12 is connected to a flexible print substrate not shown in the drawing, and the conductive film 2A for a touch sensor is electrically connected to an external apparatus not shown in the drawing. The layer 13A to be bonded to a support has a high modulus of elasticity at a high temperature, for example, a modulus of elasticity of 0.10 MPa or more at 130° C. Therefore, even though the conductive film 2A for a touch sensor is pressed in the lamination direction of the conductive layer 12, the layer 13A to be bonded to a support, and the support 14 during thermocompression, the conductive layer 12 is inhibited from being displaced in the lamination direction, which makes it possible to prevent the breaking of the plurality of first external connection terminals 23 in the conductive layer 12. The modulus of elasticity of the layer 13A to be bonded to a support at 130° C. refers to a modulus of elasticity that the curable adhesive layer 41 having undergone curing has at 130° C.

The conductive film 2A for a touch sensor manufactured as above is constituted with the conductive layer 12, the layer 13A to be bonded to a support, and the support 14 that each have flexibility. Therefore, for example, even though the conductive film 2A for a touch sensor is disposed on a flexible display not shown in the drawing just as the conductive film 2 for a touch sensor in the first embodiment, and the flexible display bends, the conductive film 2A for a touch sensor can bend along with the flexible display, and the plurality of first detection electrodes 21 and the plurality of first external connection terminals 23 included in the conductive layer 12 are also prevented from being broken.

According to the transfer foil 1A for a touch sensor of the second embodiment of the present invention, as in the transfer foil 1 for a touch sensor according to the first embodiment, the peel adhesion between the temporary support 11 and the conductive layer 12 is low enough, which is 0.20 N/mm or less. Therefore, in a case where an attempt is made to peel the temporary support 11 from the conductive layer 12, the plurality of first detection electrodes 21, the plurality of first lead wires 22, and the plurality of first external connection terminals 23 are prevented from being broken due to an incident in which a part of the conductive layer 12 remains bonded to the temporary support 11 and cannot be peeled from the temporary support 11.

Furthermore, the layer 13A to be bonded to a support has a modulus of elasticity of 0.10 MPa or more at a temperature of 130° C. Therefore, in the conductive film 2A for a touch sensor formed using the transfer foil 1A for a touch sensor, in a case where the plurality of first external connection terminals 23 is connected to a flexible print substrate not shown in the drawing by a thermocompression method, the displacement of the layer 13A to be bonded to a support is inhibited, which prevents the occurrence of an incident in which the support 14 disposed on the layer 13A to be bonded to a support bends and causes the plurality of first external connection terminals 23 to be excessively displaced in the lamination direction of the conductive film 2 for a touch sensor As a result, in a case where the plurality of first external connection terminals 23 in the conductive film 2A for a touch sensor is connected to a flexible print substrate by a thermocompression method, cracking and breaking of the plurality of first external connection terminals 23 is prevented.

Hereinafter, each member constituting the transfer foils 1 and 1A for a touch sensor and the conductive films 2 and 2A for a touch sensor according to the first and second embodiments of the present invention will be described.

<Temporary Support>

Examples of the temporary support 11 of the transfer foils 1 and 1A for a touch sensor according to the first and second embodiments of the present invention include a plastic film, a plastic plate, and the like. As raw materials of the plastic film and the plastic plate, for example, it is possible to use polyesters such as polyethylene terephthalate (PET) and polyethylene naphthalate (PEN); polyolefins such as polyethylene (PE), polypropylene (PP), polystyrene, and an ethylene vinyl acetate copolymer: vinyl-based resins such as polyvinyl chloride and polyvinylidene chloride, polyether ether ketone (PEEK), polysulfone (PSF), polyether sulfone (PES), polycarbonate (PC), polyamide, polyimide, an acrylic resin, triacetyl cellulose (TAC), and the like. From the viewpoint of obtaining excellent workability, adhesiveness, and peeling properties, PET can be preferably used. The temporary support 11 may be colored depending on the purpose.

The plastic film and the plastic plate can be used as a single layer or as a multilayer film consisting of a combination of two or more layers.

The thickness of the temporary support 11 is preferably 10 μm or more and 500 μm or less, and more preferably 50 μm or more and 250 μm or less.

Furthermore, for the purpose of further improving the adhesiveness of the conductive layer 12 to the support 14, the temporary support 11 may be subjected to a pretreatment, such as a chemical treatment, a mechanical treatment, a corona discharge treatment, a flame treatment, an ultraviolet treatment, a high frequency treatment, a glow discharge treatment, an active plasma treatment, a layer treatment, a mixed acid treatment, or a surface activation treatment such as an ozone oxidation treatment.

<Layer to be Bonded to Support>

The layer 13 to be bonded to a support includes a pressure-sensitive adhesive layer or a curable adhesive layer. The layer 13A to be bonded to a support includes both the pressure-sensitive adhesive layer 42 and the curable adhesive layer 41.

The pressure-sensitive adhesive layer is a layer that binds one layer to the other layer by means of bonding the layers via a pressure-sensitive adhesive. After being bonded to two layers, the pressure-sensitive adhesive layer is not subjected to a curing treatment, in contrast, the curable adhesive layer is a layer that hinds two layers via a curable adhesive and then is subjected to a curing treatment so that the bonded layers are combined. In the present invention, the pressure-sensitive adhesive layer has a glass transition temperature (Tg) of 25° C. or less, and the curable adhesive layer has a glass transition temperature (Tg) of higher than 25° C. after curing. "Glass transition temperature (Tg)" mentioned herein is a value measured according to J1S K 7121. That is, Tg means a temperature at which a heated and melted polymer experiences the transition to a glass state from a supercooled liquid state as the polymer continuously cooled under certain conditions.

The pressure-sensitive adhesive layer can include various adhesives, such as a rubber-based pressure-sensitive adhesive, an acrylic pressure-sensitive adhesive, a silicone-based pressure-sensitive adhesive, and a urethane-based pressure-sensitive adhesive. Among these, an acrylic pressure-sensitive adhesive is preferable.

The acrylic pressure-sensitive adhesive is a pressure-sensitive adhesive including a polymer ((meth)acrylic polymer) of a monomer component including an acrylate monomer and/or a methacrylate monomer. Although the acrylic pressure-sensitive adhesive contains the aforementioned polymer as a base polymer, other components (such as a viscosity imparting agent, rubber, and the like which will be described later) may also be contained in the acrylic pressure-sensitive adhesive.

It is preferable that the curable adhesive layer contain a thermosetting resin or a photocurable resin. Especially, from the viewpoint of transparency and insulating properties, it is preferable that the curable adhesive layer contain an epoxy-based resin or an acrylic resin having a crosslinking functional group.

Each of the pressure-sensitive adhesive layer and the curable adhesive layer included in the layers 13 and 13A to be bonded to a support has a thickness of 20 μm or less.

In a case where the plurality of first external connection terminals 23 in the conductive layer 12 is connected to a flexible print substrate not shown in the drawing by a thermocompression method, from the viewpoint of preventing the breaking of the plurality of first external connection terminals 23, the layers 13 and 13A to be bonded to a support have a modulus of elasticity of 0.10 MPa or more at a temperature of 130° C., more preferably have a modulus of elasticity of 0.15 MPa or more at a temperature of 130° C., and even more preferably have a modulus of elasticity of 0.20 MPa or more at a temperature of 130° C.

As one of the preferred aspects of the layer 13 to be bonded to a support and one of the preferred aspects of the pressure-sensitive adhesive layer 42 of the layer 13A to be bonded to a support, in view of further improving the effects of the present invention, for example, a pressure-sensitive adhesive layer is obtained by photo-curing a pressure-sensitive adhesive composition (hereinafter, also simply called "composition") containing the following components (A) to (F). Particularly, having a polymerizable group, the component (F) reacts with a material constituting the pressure-sensitive adhesive layer, such as the component (C), during the manufacturing of the pressure-sensitive adhesive layer. Furthermore, in a high-temperature and high-humidity environment, the reactive group contained in the molecule reacts with the surface of the support 14. That is, the component (F) is a component that binds the support 14 and the pressure-sensitive adhesive layer, and plays a role of further enhancing the adhesiveness between the support 14 and the pressure-sensitive adhesive layer.

(A) Rubber (B) Crosslinking agent (C) Monofunctional (meth)acrylic monomer having at least one group selected from the group consisting of a linear or branched alkyl group having 8 or more carbon atoms and an alicyclic hydrocarbon group (D) Photopolymerization initiator (E) Viscosity imparting agent (F) Compound being different from components (A) to (E) and having at least one reactive group selected from the group consisting of an epoxy group, an oxetanyl group, an isocyanate group, a carbodiimide group, and an ammo group and at least one polymerizable group selected from the group consisting of a radically polymerizable group and an epoxy group Hereinafter, each of these components will be specifically described.

(Component (A): Rubber)

In a case where the composition contains rubber, the pressure-sensitive adhesive layer is plasticized and has a modulus of elasticity in a preferred range. That is, the rubber acts as a so-called plasticizer.

In the present invention, the rubber has the same definition as an elastomer, and the type of rubber is not particularly limited. Examples of the rubber include natural rubber, polyisobutylene, polybutene, polyisoprene, poly butadiene, hydrogenated polyisoprene, hydrogenated polybutadiene, styrene-butadiene rubber, a copolymer consisting of a combination of any rubbers selected from the above group, and the like. One rubber may be used alone, or two or more rubbers may be used in combination.

A polymerizable group (for example, a radically polymerizable group) is not included in the rubber.

The rubber content of the component (A) in the composition is not particularly limited. However, in view of further improving the effects of the present invention, the rubber content with respect to the total mass of the components (A) to (F) is preferably 15% by mass or more and 45% by mass or less, and more preferably 20% by mass or more and 35% by mass or less.

In a case where two or more rubbers are used, it is preferable that the total content of the rubbers be in the above range.

(Component (B): Crosslinking Agent)

The crosslinking agent means a compound having a plurality of (two or more) crosslinkable groups (for example, radically polymerizable groups), and plays a role of imparting a crosslinking structure to the pressure-sensitive adhesive layer to be formed.

The type of crosslinkable group is not particularly limited. For example, a radically polymerizable group is preferable Examples of the radically polymerizable group include a (meth)acryloyl group, an acrylamide group, a vinyl group, a styryl group, an allyl group, and the like. Among these, in view of further improving the effects of the present invention, a methacryloyl group is preferable.

"(Meth)acryloyl group" is a concept including an acryloyl group and a methacryloyl group.

The type of skeleton in the crosslinking agent is not particularly limited. In view of further improving the effects of the present invention, one compound selected from the group consisting of polybutadiene, polyisoprene, hydrogenated polybutadiene, and hydrogenated polyisoprene is preferable. Especially, the crosslinking agent is more preferably one compound selected from the group consisting of poly butadiene, polyisoprene, hydrogenated poly isoprene, and hydrogenated polyisoprene that have a (meth)acryloyl group.

The content of a crosslinking agent of the component (B) in the composition is not particularly limited. In view of further improving the effects of the present invention, the content of a crosslinking agent with respect to the total mass of the components (A) to (F) is preferably 5% by mass or more and 35% by mass or less, and more preferably 20% by mass or more and 30% by mass or less.

Furthermore, in view of further improving the effects of the present invention, the content of a crosslinking agent with respect to the total mass of the monofunctional (meth)acrylic monomer, which will be described later, is preferably 10% by mass or more and 200% by mass or less, and more preferably 25% by mass or more and 120% by mass or less In a case where two or more crosslinking agents are used, it is preferable that the total content of the crosslinking agents be in the above range (Component (C): Monofunctional (Meth)Acrylic Monomer)

The monofunctional (meth)acrylic monomer is a monomer having at least one group selected from the group consisting of a linear or branched alkyl group having 8 or more carbon atoms and an alicyclic hydrocarbon group.

The monofunctional (meth)acrylic monomer is a polymerizable compound having one (meth)acryloyl group. "(Meth)acryloyl group" is a general term that includes both a methacryloyl group and an acryloyl group.

The number of carbon atoms in the linear or branched alkyl group is 8 or more. In view of further improving the effects of the present invention, the number of carbon atoms is preferably 8 or more and 30 or less, and more preferably 8 or more and 15 or less.

The alicyclic hydrocarbon group is not particularly limited. The number of carbon atoms in the alicyclic hydrocarbon group is preferably 3 or more and 30 or less, and more preferably 5 or more and 20 or less. The alicyclic hydrocarbon group may be monocyclic or poly cyclic. Specific examples of the monocyclic alicyclic hydrocarbon group include a cyclopentyl group, a cyclohexyl group, and the like Specific examples of the polycyclic alicyclic hydrocarbon group include an isobornyl group, an adamantyl group, and the like The content of a monofunctional (meth)acrylic monomer of the component (C) in the composition is not particularly limited. In view of further improving the effects of the present invention, the content of a monofunctional (meth) acrylic monomer with respect to the total mass of the components (A) to (F) is preferably 10% by mass or more and 45% by mass or less, and more preferably 20% by mass or more and 30% by mass or less.

In a case where two or more monofunctional (meth) acrylic monomers are used, it is preferable that the total content of the monofunctional (meth)acrylic monomers be in the above range.

(Component (D): Photopolymerization Initiator)

The type of photopolymerization initiator is not particularly limited, and known photopolymerization initiators (a radical photopolymerization initiator and a cationic photopolymerization initiator) can be used. Examples of the photopolymerization initiator include an alkylphenone-based photopolymerization initiator, a methoxyketone-based photopolymerization initiator, an acylphosphine oxide-based photopolymerization initiator, a hydroxyketone-based photopolymerization initiator (for example, IRGACURE 184; 1,2-α-hydroxyalkyl phenone), an aminoketone-based photopolymerization initiator (for example, 2-methyl-1-(4-(methythio)phenyl)-2-morpholino-propan-1-one (IRGA-CURE (registered trademark) 907)), and an oxime-based photopolymerization initiator.

Particularly, it is preferable that the composition contain at least one compound selected from the group consisting of monoacylphosphine oxide (A1) and bisacylphosphine oxide (A2), as a photopolymerization initiator.

The content of a photopolymerization initiator of the component (D) in the composition is not particularly limited. In view of further improving the effects of the present invention, the content of a photopolymerization initiator with respect to the total mass of the components (A) to (F) is preferably 1.0% by mass or more and 5.0% by mass or less, and more preferably 2.0% by mass or more and 4.0% by mass or less.

In a case where two or more photopolymerization initiators are used, it is preferable that the total content of the photopolymerization initiators be in the above range.

(Component (E): Viscosity Imparting Agent)

As the viscosity imparting agent, those known in the field of patch or patch preparation may be appropriately selected and used. Examples of the viscosity imparting agent include viscosity imparting resins. Examples thereof include a rosin-based resin such as a rosin ester, a hydrogenated rosin ester, a disproportionated rosin ester, or a polymerized rosin ester; a coumarone indene-based resin such as a coumarone indene resin, a hydrogenated coumarone indene resin, a phenol-modified coumarone indene resin, or an epoxy-modified coumarone indene resin: an α-pinene resin, a β-pinene resin; a terpene-based resin such as a polyterpene resin, a hydrogenated terpene resin, an aromatic modified terpene resin, or a terpene phenol resin; a petroleum resin such as an aliphatic petroleum resin, an aromatic petroleum resin, or an aromatic modified aliphatic petroleum resin. Each of these can be used alone, or two or more of these am be used in combination. Among these, a rosin-based resin, a terpene-based resin, or a coumarone indene resin is particularly preferable The content of a viscosity imparting agent of the component (E) in the composition is not particularly limited. In view of further improving the effects of the present invention, the content of a viscosity imparting agent with respect to the total mass of the components (A) to (F) is preferably 25% by mass or more and 50% by mass or less, and more preferably 35% by mass or more and 45% by mass or less.

There are no particular limitations on the ratio of the mass of a viscosity imparting agent to the total mass of the rubber and crosslinking agent described above {(mass of viscosity imparting agent/total mass of rubber and crosslinking agent)×100}. In view of further improving the effects of the present invention, the mass ratio is preferably 60% by mass or more and 300% by mass or less, and more preferably 80% by mass or more and 200% by mass or less.

In a case where two or more viscosity imparting agents are used, it is preferable that the total content of the viscosity imparting agents be in the above range.

(Component (F): Compound Having Reactive Group and Polymerizable Group)

The component (F) is a compound which is different from the components (A) to (E) and has at least one reactive group selected from the group consisting of an epoxy group, an oxetanyl group, an isocyanate group, a carbodiimide group, and an amino group and at least one polymerizable group selected from the group consisting of a radically polymerizable group and an epoxy group.

The reactive group is selected from the group consisting of an epoxy group, an oxetanyl group, an isocyanate group, a carbodiimide group, and an amino group. In view of further improving the effects of the present invention, an epoxy group is preferable.

The number of reactive groups is not particularly limited. In view of further improving the effects of the present invention, the number of reactive groups is preferably 1 or more and 3 or less, and more preferably 1.

The polymerizable group is selected from the group consisting of a radically polymerizable group and an epoxy group. In view of further improving the effects of the present invention, a radically polymerizable group is preferable. Examples of the radically polymerizable group include a (meth)acryloyl group, an acrylamide group, a vinyl group, a styryl group, an allyl group, and the like. Among these, in view of further improving the effects of the present invention, a (meth)acryloyl group is preferable.

The number of polymerizable groups is not particularly limited. In view of further improving the effects of the present invention, the number of polymerizable groups is preferably 1 or more and 2 or less, and more preferably 1.

In a case where the reactive group and the polymerizable group are both an epoxy group, the component (F) means a polyfunctional epoxy compound having two or more epoxy groups.

Furthermore, the component (F) is a compound different from the components (A) to (E).

Examples of preferable embodiments of the above compounds include a compound represented by the following General Formula (X).

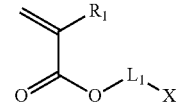

General Formula (X)

$R_1$ represents hydrogen, a methyl group, a trifluoromethyl group, or a hydroxymethyl group. Among these, in view of further improving the effects of the present invention, hydrogen or a methyl group is preferable.

$L_1$ represents alkylene or alkylene oxide. The number of carbon atoms in the alkylene moiety in the alkylene group and the alkylene oxide group is not particularly limited. In view of further improving the effects of the present invention, the number of carbon atoms is preferably 1 or more and 10 or less, and more preferably 1 or more and 5 or less.

X represents a group containing at least one reactive group selected from an epoxy group, an oxetanyl group, an isocyanate group, a carbodiimide group, and an amino group. The group containing a reactive group may contain the aforementioned reactive group. Examples of such a group include a group represented by $-L_2-(R_2)_n$. $L_2$ represents a single bond or a divalent organic group. Examples of the divalent organic group include —O—, —CO—, —NH—, —CO—NH—, —COO—, —O—COO—, an alkylene group, an arylene group, a heterocyclic group (heteroaryl group), and a divalent linking group selected from combinations of these Examples of $R_2$ include a reactive group selected from an epoxy group, an oxetanyl group, an isocyanate group, a carbodiimide group, and an amino group, n represents an integer of 1 or more. Especially, n is preferably 1 or more and 3 or less, and more preferably 1. In a case where n is 2 or more. $R_2$ is bonded instead of the hydrogen atom in $L_2$.

The content of the component (F) in the composition is not particularly limited. In view of further improving the effects of the present invention, the content of the component (F) with respect to the total mass of the components (A) to (F) is preferably 0.5% by mass or more and 5% by mass or less, more preferably 1% by mass or more and 5% by mass or less, and even more preferably 1.5% by mass or more and 3% by mass or less.

Furthermore, in view of further improving the effects of the present invention, the mass of the component (F) contained in the composition with respect to the total mass of the component (C) is preferably 2% by mass or more and 40% by mass or less, more preferably 2% by mass or more and 20% by mass, and even more preferably 4% by mass or more and 15% by mass or less.

In a case where two or more components (F) are used, it is preferable that the total content of the components (F) be in the above range.

Although the composition contains the components (A) to (F), other components may also be contained in the composition.

For example, if necessary, the composition may contain a solvent. Examples of the solvent to be used include water, an organic solvent (for example, alcohols such as methanol, ketones such as acetone, amides such as formamide, sulfoxides such as dimethyl sulfoxide, esters such as ethyl acetate, ethers, and the like) and a mixed solvent of these The composition may also contain a chain transfer agent. The type of chain transfer agent is not particularly limited, and known chain transfer agents (for example, 1-dodecanethiol, trimethylolpropane tristhiopropionate, pentaerythritol tetrakisthiopropionate, and the like) are used. The content of a chain transfer agent is not particularly limited, but is preferably 1% by mass or more and 4% by mass or Jess with respect to the total mass of the components (A) to (F).

In addition to the above components, various known additives, such as a surface lubricant, a leveling agent, an antioxidant, an anticorrosive, a light stabilizer, an ultraviolet absorber, a polymerization inhibitor, a silane coupling agent, an inorganic or organic tiller, metal powder, powder of a pigment or the like, a particle-like substance, and a foil-like substance, can be appropriately added to the composition depending on the use.

Examples of the curable adhesive contained in the curable adhesive layer include curable adhesives containing an acrylic photocurable resin, such as NOA71 (manufactured by Norland Products. Inc.). TB3074C (manufactured by ThreeBond Co., Ltd.), and GL-1002 (manufactured by Gluelabo Ltd). Examples of the curable adhesive containing an epoxy-based photocurable resin include OG198-54 (manufactured by Epoxy Technology. Inc.). OG198-55 (manufactured by Epoxy Technology, Inc), and the like Examples of the curable adhesive containing an epoxy-based thermosetting resin include E-623P/H-9028 (manufactured by CHEMITEC INC.), and the like.

<Conductive Member>

The conductive member used in the plurality of first detection electrodes 21, the plurality of first lead wires 22, and the plurality of first external connection terminals 23 of the conductive layer 12 is constituted with a conductive material and a binder containing a resin material.

<Conductive Material of Conductive Member>

The conductive material of the conductive member is a portion that ensures the conductivity of the conductive member, and is composed of a material having conductivity. The conductive material is constituted with a metal or a non-metal. As the metal constituting the conductive material, in view of higher conductivity, for example, gold, silver, copper, or aluminum is preferable, and silver is particularly preferable. Examples of the non-metal constituting the conductive material include carbon nanotubes, carbon nanobuds, graphene, a conductive polymer, and a metal oxide such as ITO. As the non-metal, metal oxide particles are preferable In a case where the conductive material is conductive fine particles, in view of further improving conductivity of the conductive member, fine particles having an anisotropic shape, such as fibrous or platelike fine particles, can also be preferably used. It is preferable that the conductive material be conductive fine particles, because then the occurrence of breaking of conductive members 16A and 17A is easily inhibited, for example, in a case where the conductive layer 12 is deformed. In addition, in the conductive member, it is preferable that the coarse/fine distribution of the conductive fine particles be narrow, because then the occurrence of breaking can be further inhibited.

In a case where conductive fine particles are used as the conductive material, the equivalent spherical diameter of the particles is preferably 1 nm or more and 1 μm or less, more preferably 10 nm or more and 0.5 μm or less, and even more preferably 20 nm or more and 0.2 μm or less. In a case where the equivalent spherical diameter is within the above range, the touch sensor unit tends to have higher transparency and higher conductivity. The equivalent spherical diameter of the conductive tine particles is obtained by calculating equivalent spherical diameters of 50 random particles by using, for example, a transmission electron microscope and calculating an arithmetic mean thereof.

From the viewpoint of preventing the thin wire consisting of a conductive member from being visible, it is also preferable to perform a blackening treatment on the thin wire. Particularly, in a case where the conductive member is composed of a metal, it is preferable to perform a blackening treatment on the thin wire, because then the reflection of external light resulting from metallic gloss can be reduced. In a case where the thin wire is damaged after being subjected to a blackening treatment, the damaged site is more noticeable than in a case where the thin wire is damaged without being subjected to the blackening treatment. As a method of blackening treatment, it is possible to preferably use a method of forming a semiconductor or insulator layer by laminating, for example, an oxide or nitride of a metal on the thin wire and a method of mixing or adsorbing a dye or pigment with or onto the thin wire. Furthermore, the thin wire may be coated with an additive, such as an antioxidant, a rust inhibitor, a stabilizer, a surfactant, or a dispersant.

<Binder of Conductive Member>

The binder of the conductive member contains a resin material. Generally, a resin material constitutes the main component of the binder. By incorporating a resin material into the conductive member, it is possible to impart flexibility to the conductive member. "Main component of the binder" means that the ratio of the resin material to the total mass of the binder is 80% by mass or more. The ratio is preferably 90% by mass or more, and more preferably 95% by mass or more. Examples of components other than the resin material include functional components such as a dispersant, a surfactant, an ultraviolet absorber, an antifoarnmg agent, and an antioxidant. The content of these functional components is not particularly limited, but is often 1% by mass or more and less than 5% by mass with respect to the total mass of the binder.

<Resin Material of Conductive Member>

The resin material of the conductive member is not particularly limited. For example, it is possible to use any of thermoplastic resins, such as a polyester-based resin, a (meth)acrylic resin, a poly olefin-based resin, a poly styrene-based resin, and a polyamide-based resin, and thermosetting resins, such as a polyester-melamine resin, a melamine resin, an epoxy-melamine resin, a phenol resin, an epoxy resin, an amino resin, and a polyimide resin. Among these, a resin ((meth)acrylic resin) selected from the group consisting of an acrylic resin and a methacrylic resin is preferable, because this resin is easy to synthesize and has excellent handleability. The (meth)acrylic resin means a resin in which the content of a repeating unit derived from a (meth) acrylate monomer is more than 50% by mass with respect to the total mass of repeating units. The (meth)acrylic resin may contain repeating units other than the repealing unit derived from a (meth)acrylate monomer. The (meth)acrylate monomer is a monomer having a (meth)acryloyl group.

It is preferable that the resin material have a crosslinking structure. It is preferable that the resin material have a crosslinking structure, because then the breaking of the conductive member caused in a case where the conductive member is repeatedly folded or stretched is easily reduced. The method of introducing the crosslinking structure into the resin material is not particularly limited. Examples thereof include a method for manufacturing the resin material by using a poly functional monomer and a method of introducing a crosslinkable group into the resin material and crosslinking the resin materials directly or via a crosslinking agent In crosslinking the resin materials, if necessary, a silane coupling agent may be used.

Examples of the poly functional monomer include monomers having two or more ethylenic unsaturated groups in one molecule, such as divinyl benzene, allyl (meth)acrylate, ethylene glycol di(meth)acrylate, diethylene glycol di(meth) acrylate, polyethylene glycol di(meth)acrylate, and trimethylolpropane tri(meth)acrylate.

One of the methods of introducing a crosslinkable group into the resin material is a method for manufacturing the resin material by using a monomer having a crosslinkable group. Specifically, examples of the monomer having a crosslinkable group include an amide group-containing monomer such as acrylamide, methacrylicamide, N-methylol (meth)acrylamide, N-methoxymethyl (meth)acrylamide, N-butoxymethyl (meth)acrylamide, or diacetone (meth)acrylamide; an amino group-containing monomer such as dimethylaminoethyl (meth)acrylate or diethylaminoethyl (meth)acrylate; an alkoxy group-containing monomer such as methoxyethyl (meth)acrylate or butoxyethyl (meth)acrylate: a glycidyl group-containing monomer such as glycidyl acrylate, glycidyl methacrylate, or glycidyl allyl ether; a hydrolyzable alkoxy group-containing silane-based monomer such as vinyltrimethoxysilane, vinyltrithoxysilane, or acryloxytrimethoxysilane, and the like. It is preferable to use a silane-based monomer among the above, because then high crosslinking efficiency is obtained and a gel fraction easily increases.

It is preferable that the resin material contain a repeating unit represented by the following Formula (1). In a case where the resin material contains the repeating unit represented by Formula (1), a crosslinking structure is introduced into the resin material, and the glass transition temperature and the gel fraction increase.

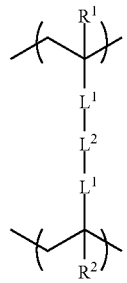

Formula (1)

In Formula (1), $R^1$ and $R^2$ each independently represent a hydrogen atom or an alkyl group.

The number of carbon atoms in the alkyl group is not particularly limited, but is preferably 1 or more and 3 or less, and more preferably 1.

$L_1$ each independently represents a single bond, an ester group (—COO—), an amide group (—CONH—), or a phenylene group $L^1$ is preferably an ester group.

$L_2$ represents a divalent linking group. The type of divalent linking group is not particularly limited. Examples of the divalent linking group include a divalent hydrocarbon group (the divalent hydrocarbon may be a divalent saturated hydrocarbon group or a divalent aromatic hydrocarbon group, the divalent saturated hydrocarbon group may be a linear, branched, or cyclic hydrocarbon group in which the number of carbon atoms is preferably 1 or more and 20 or less, examples thereof include an alkylene group, the number of carbon atoms in the divalent aromatic hydrocarbon group is preferably 6 or more and 20 or less, examples of the divalent aromatic hydrocarbon group include a phenylene group, the divalent aromatic hydrocarbon group may also be an alkenylene group or an alkynylene group), a divalent heterocyclic group, —O—, —S—, —SO$_2$—, —NR$^L$—, —C(=O)—, —C(=O)O—, —C(=O)NR$^L$—, —SO$_3$—, —SO$_2$NR$^L$—, and a group consisting of a combination of two or more of these (for example, an analkyleneoxy group, an alkyleneoxycarbonyl group, or an alkylene carbonyloxy group, or the like) R$^L$ represents a hydrogen atom or an alkyl group (the number of carbon atoms is preferably 1 or more and 10 or less).

The content of the repeating unit represented by Formula (1) is not particularly limited. In view of easily obtaining a resin material having desired characteristics, the content of the repeating unit represented by Formula (1) with respect to the total mass of repeating units contained in the resin material is preferably 0.1% by mass or more and 10.0% by mass, and more preferably 0,2% by mass or more and 5.0% by mass or less.

It is preferable that the resin material contain a repeating unit represented by Formula (2).

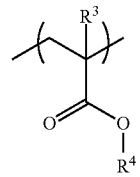

Formula (2)

In Formula (2), $R^3$ represents a hydrogen atom, an alkyl group, a halogen atom, or —CH$_2$COOR$^{10}$. The number of carbon atoms in the alkyl group is not particularly limited, but is preferably 1 or more find 3 or less, find more preferably 1. $R^{10}$ represents a hydrogen atom or an alkyl group having 1 or more and 80 or less carbon atoms.

$R^4$ represents an alkyl group, an alkenyl group, or an alkynyl group. The number of carbon atoms contained in $R^4$ is not particularly limited, but is preferably 1 or more and 80 or less, more preferably 1 or more and 50 or less, even more preferably 1 or more and 30 or less, and particularly preferably 1 or more and 20 or less.

As the repeating unit represented by Formula (2), one repeating unit may be used alone, or two or more repeating units may be used in combination. For example, it is preferable to use a repeating unit in which $R^4$ represents an alkyl group, an alkenyl group, or an alkynyl group having 1 or more and 3 or less carbon atoms in combination with a repeating unit in which $R^4$ represents an alkyl group, an alkenyl group, or an alkynyl group having 4 or more and 80 or less carbon atoms.

The content of the repeating unit represented by Formula (2) is not particularly limited, but is preferably 0.5% by mass or more and 95.0% by mass or less with respect to the total mass of repeating units contained in the resin material.

<Support>

The support 14 is not particularly limited as long as it is transparent and has electrical insulating properties Examples of materials constituting the support 14 include glass, tempered glass, alkali-free glass, a polycarbonate-based polymer, a polyester-based polymer such as polyethylene terephthalate (PET) or polyethylene naphthalate (PEN), a styrene-based polymer such as polystyrene or an acrylonitrilestyrene copolymer (AS resin), and the like. The examples also include polyolefins such as polyethylene and polypropylene, norbornene-based resins, polyolefin-based polymers such as ethylene/propylene copolymers. (meth) acrylic polymers such as polymethyl methacrylate, vinyl chloride-based polymers, amide-based polymers such as nylon and aromatic polyamide, imide-based polymers, sulfone-based polymers, polyether sulfone-based polymers, polyether ether ketone-based polymers, polyphenylene sulfide-based polymers, vinylidene chloride-based polymers, vinyl alcohol-based polymers, vinyl butyral-based polymers, arylate-based polymers, polyoxymethylene-based polymers, epoxy-based polymers, cellulose-based polymers represented by triacetyl cellulose, copolymers of the above polymers, and polymers obtained by mixing together the above polymers.

Particularly amide-based polymers such as aromatic polyamide and imide-based polymers can be preferably used as the substrate, because the number of times of folding at break measured for these polymers by an MIT tester according to Japanese Industrial Standards (JIS) P8115 (2001) is large, and these polymers have relatively high hardness. For example, the aromatic polyamide described in Example 1 of JP5699454B and the polyimides described in JP2015-508345A, JP2016-521216A, and WO2017/014287A can be preferably used as the substrate.

The thickness of the support 14 is, for example, preferably 3 μm or more and 250 μm or less. The total light transmittance of the support 14 is not limited, but is preferably 40% or more and 100% or less, and more preferably 80% or more and 100% or less The modulus of elasticity (σA) of the support 14 is preferably 6.0 GPa or more and 9.0 GPa or less, more preferably 7.0 GPa or more and 9.0 GPa or less, and even more preferably 7.5 GPa or more and 9.0 GPa or less.

A hardcoat layer may be provided on the support 14. Furthermore, functional layers other than the hardcoat layer may be provided on the support 14.

The functional layers other than the hardcoat layer are not particularly limned, and examples thereof include a scratch resistant layer, a conductive layer, a barrier layer, an adhesive layer, an ultraviolet (UV) absorbing layer, an antifouling layer, and the like.

<Hardcoat Layer>

The hardcoat layer is preferably formed on a surface of the support 14, the surface opposite to the layer to be bonded to a support.

(Compound having Silsesquioxane Structure)

The hardcoat layer contains a compound having a silsesquioxane structure.

"Silsesquioxane structure" means a structure composed of siloxane bonds (Si—O—Si) in a silsesquioxane.

A polyorganosilsesquioxane is a network-type polymer or polyhedral cluster having a siloxane constitutional unit derived from a hydrolyzable trifunctional silane compound, and can form a random structure, a ladder structure, a cage structure, and the like by a siloxane bond. In the present invention, although the silsesquioxane structure mas be any of the above structures, it is preferable that the silsesquioxane structure contain mans ladder structures. In a case where the ladder structure is formed, the deformation recovery of the hardcoat film can be excellently maintained. Whether the ladder structure is formed can be qualitatively determined by checking whether or not absorption occurs which results from Si—O—Si expansion/contraction unique to the ladder structure found at around 1.020 to 1.050 cm$^{-1}$ by Fourier Transform Infrared Spectroscopy (FT-IR).

Furthermore, in the present invention, "compound having a silsesquioxane structure" may be a silsesquioxane, a compound composed of two or more polyorganosilsesquioxanes bonded together (for example, a cured product of a polyorganosilsesquioxane having a polymerizable group), or a cured product of a polyorganosilsesquioxane having a polymerizable group and another polymerizable compound. That is, "compound having a silsesquioxane structure" also includes a polymer having a three-dimensional network structure and a matrix of a hardcoat layer.

From the viewpoint of hardness and folding resistance, the compound having a silsesquioxane structure is preferably a cured product of a polyorganosilsesquioxane having a polymerizable group. The cured product of a polyorganosilsesquioxane having a polymerizable group is preferably obtained by curing a composition containing a polyorganosilsesquioxane having a polymerizable group by at least either heating or irradiation with ionizing radiation.

(Polyorganosilsesquioxane (A) Having Polymerizable Group)

The polymerizable group in the polyorganosilsesquioxane (A) having a polymerizable group (also called "poiyorganosilsesquioxane (A)") is not particularly limited, but is preferably a radically or cationically polymerizable group.

As the radically polymerizable group, a generally known radically polymerizable group can be used. For example, a vinyl group and a (meth)acryloyl group are suitable as the radically polymerizable group. Among these, a (meth)acryloyl group is preferable As the cationically polymerizable group, a generally known cationically polymerizable group can be used. Specifically, examples thereof include an ah cyclic ether group, a cyclic acetal group, a cyclic lactone group, a cyclic thioether group, a spiro-orthoester group, a vinyloxy group, and the like. Among these, an alicyclic ether group and a vinyloxy group are preferable, an epoxy group, an oxetanyl group, and a vinyloxy group are more preferable, and an epoxy group is even more preferable.

The compound having a silsesquioxane structure is preferably a cured product of a poiyorganosilsesquioxane having at least one of a (meth)acryloyl group or an epoxy group.

The poiyorganosilsequioxane (A) having a polymerizable group is preferably a poiyorganosilsesquioxane (a1) having an epoxy group or a poiyorganosilsesquioxane (a2) having a (meth)acryloyl group.

Hereinafter, peripheral portions that can be laminated on the transfer foils 1 and 1A for a touch sensor and the conductive films 2 and 2A for a touch sensor will be described.

<Protective Layer>

In the transfer foils 1 and 1A for a touch sensor and the conductive films 2 and 2A for a touch sensor, a protective layer not shown in the drawing mas be provided on the conductive layer 12. In a case where the protective layer is provided on the conductive layer 12, in the process of bonding the layers 13 and 13A to be bonded to a support of the transfer foils 1 and 1A for a touch sensor to the support 14 and then making an attempt to peel the temporary support 11 from the conductive layer 12, it is possible to further prevent breaking of the plurality of first detection electrodes 21, the plurality of first lead wires 22, and the plurality of first external connection terminals 23. The protective layer preferably consists of gelatin, a high-molecular-weight polymer, or the like. The thickness of the protective layer is preferably 0.02 µm or more and 0.20 µm or less, and more preferably 0.05 µm or more and 0.10 µm or less. Furthermore, the protective layer may be provided directly on the conductive layer, or may be provided on the conductive layer after an undercoat layer is provided on the conductive layer.

EXAMPLES

Hereinafter, the present invention will be more specifically described with reference to examples, but the present invention is not limited thereto.

Example 1

<Preparation of Pressure-Sensitive Adhesive>

An esterification product (19.6 parts by mass, trade name UC102, manufactured by KURARAY CO., LTD., molecular weight 19,000) of a maleic acid anhydride adduct of a polyisoprene polymer and 2-hydroxyethyl methacrylate, 11.9 parts by mass of polybutadiene (trade name Poluvest110, manufactured by Evonik Degussa GMBH), 18 parts by mass of isobornyl acrylate (manufactured by Tokyo Chemical Industry Co., Ltd.), 5 parts by mass of 2-ethylhexyl acrylate (manufactured by FUJI FILM Wako Pure Chemical Corporation), 2 parts by mass of CYCLOMER M-100 (manufactured by Dated Chemical Industries Ltd.), and 38.8 parts by mass of a terpene-based hydrogenated resin (trade name CLEARON P-135, manufactured by YASUHARA CHEMICAL CO., LTD.) were kneaded in a constant-temperature tank at 130° C. by using a kneader. Then, the temperature of the constant-temperature tank was adjusted to 80° C., 1.7 parts by mass of 1-dodecanethiol (DDT, manufactured by Tokyo Chemical Industry Co., Ltd.) and 3 parts by mass of a photopolymerization initiator (trade name: Lucirin TPO, manufactured by BASF SE) were added thereto and kneaded using a kneader, thereby preparing a pressure-sensitive adhesive.

A surface of a 75 µm thick peeling sheet (PET75TP-01: manufactured by PANAC corporation.) having undergone surface treatment was coated with the obtained pressure-sensitive adhesive up to a thickness of 15 µm, and a surface of a 50 µm thick peeling sheet (PET50TP-02: manufactured by PANAC corporation.) having undergone surface treatment was bonded to the coated surface. By using a metal halide UV (ultraviolet) lamp (manufactured by Fusion UV Systems GmbH), the sample sandwiched between the peeling sheets was irradiated with UV light at an irradiation energy of 1 J/cm$^2$, thereby obtaining a pressure-sensitive adhesive sheet. The pressure-sensitive adhesive of the pressure-sensitive adhesive sheet obtained as above corresponds to the layer 13 to be bonded to a support in the first embodiment of the present invention.

<Manufacturing of Laminate Having Resin Substrate and Conductive Portion>

(Preparation of Silver Halide Emulsion)

The following liquids 2 and 3 in an amount equivalent to 90% of the following amount were stirred and simultaneously added for 20 minutes to the following liquid 1 kept at 38° C. and pH 4.5, thereby forming 0.16 µm core particles. Then, the following liquids 4 and 5 were added thereto for 8 minutes, and the remaining 10% of the following liquids 2 and 3 were added thereto for 2 minutes so that the particles grew to have a size of 0.21 µm. Furthermore, 0.15 g of potassium iodide was added thereto, and the emulsion was aged for 5 minutes so that panicle formation finished.

| <Liquid 1> | |
|---|---|
| Water | 750 m |
| Gelatin | 8.6 g |
| Sodium chloride | 3.1 g |
| 1,3-Dimethylimidazolidine-2-thione | 20 mg |
| Sodium benzenethiosulfonate | 10 mg |
| Citric acid | 0.7 g |
| <Liquid 2> | |
| Water | 300 ml |
| Silver nitrate | 150 g |
| <Liquid 3> | |
| Water | 300 ml |
| Sodium chloride | 38 g |
| Potassium bromide | 32 g |
| Potassium hexachloroiridate (III) (0.005% KCl 20% aqueous solution) | 5 ml |
| Ammonium hexachlororhodate (0.001% NaCl 20% aqueous solution) | 7 ml |
| <Liquid 4> | |
| Water | 100 ml |
| Silver nitrate | 50 g |
| <Liquid 5> | |
| Water | 100 ml |
| Sodium chloride | 13 g |
| Potassium bromide | 11 g |
| Yellow prussiate of potash | 5 mg |

Then, according to the conventional method the emulsion was rinsed by a flocculation method. Specifically, the temperature was lowered to 35° C., and the pH was lowered using sulfuric acid until silver halide was precipitated (pH was in a range of 3.6±0.2). Then, about 3 liters of the supernatant solution was removed (first rinsing). Furthermore, 3 liters of distilled water was added thereto, and then sulfuric acid was added thereto until silver halide was precipitated. Three liters of the supernatant solution was removed again (second rinsing). The same operation as the second rinsing was repeated once more (third rinsing) so that the rinsing and desalting step finished. The pH and pAg of the emulsion obtained after the rinsing and desalting step were adjusted to 6.3 and 7.4 respectively, and as chemical sensitization, 2.5 g of gelatin, 10 mg of sodium benzenethiosulfonate, 3 mg of sodium benzenethiosulfinate, 15 mg of sodium thiosulfate, and 10 mg of chlorauric acid were added thereto so that optimum sensitivity is obtained at 55° C. Furthermore, 100 mg of 1,3,3a,7-tetraazaindene as a stabilizer and 100 mg of PROXEL (trade name, manufactured by ICICo., Ltd.) as a preservative were added thereto. The finally obtained emulsion was an emulsion of silver iodochlorobromide cubic particles that contained 0.08 mol % of silver iodide and silver chlorobromide composed of 70 mol % of silver chloride and 30 mol % of silver bromide, and had an average particle diameter of 0.21 μm and a coefficient of variation of 9.5%.

<Preparation of Composition for Forming Photosensitive Layer>

1,3,3a,7-Tetraazaindene 1.2×10-4 mol/mol Ag, hydroquinone 1.2×10-2 mol/mol Ag, citric acid 3.0×10-4 mol/mol Ag, 2,4-dichloro-6-hydroxy-1,3,5-triazine sodium salt 0.90 g/mol Ag, and a trace of hardener were added to the aforementioned emulsion, and the pH of the coating solution was adjusted to 5.6 by using citric acid.

For gelatin contained in the coating solution, a dispersant consisting of a polymer represented by the following (P-1) and a dialkylphenyl PEO sulfate ester was added to the coaling solution. The amount of a crosslinking agent added was adjusted so that the amount of the crosslinking agent in the silver halide-containing photosensitive layer, which will be described later, was 0.09 g/m². The composition for forming a photosensitive layer was prepared as described above.

The polymer represented by (P-1) was synthesized with reference to Japanese Patent No. 3305459 and Japanese Patent No. 3754745.

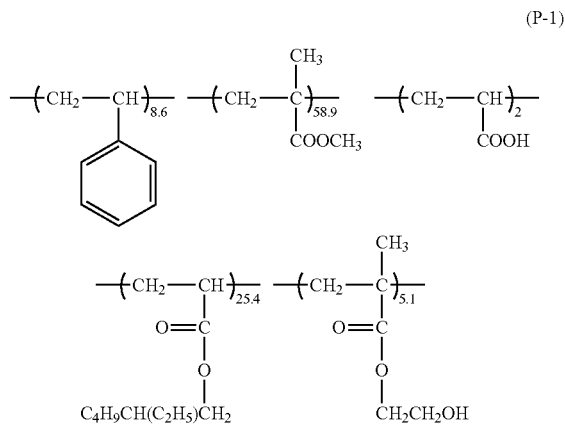

(P-1)

(Photosensitive Layer Forming Step)

A 100 μm thick polyethylene terephthalate (PET) film having no undercoat layer was coated with the composition for forming a photosensitive layer described above, thereby providing a 2.5 μm thick silver halide-containing photosensitive layer. The content of the polymer in the silver halide-containing photosensitive layer was 0.88 g/m². The amount of silver was 6 g/m².

Then, the silver halide-containing photosensitive layer was coated with a composition for forming a protective layer obtained by mixing the aforementioned polymer latex with gelatin, thereby providing a 0.15 μm thick protective layer. The mixing mass ratio of polymer to gelatin (polymer/gelatin) was 0.1/1, and the content of the polymer was 0.015 g/m².

(Exposure Development Step)

Through a photo mask having the mesh pattern MP, which is composed of arrays of a plurality of square grids formed of the thin wires T basing a width WA of 4.0 μm and a wire interval WB of 296 μm as shown in FIG. 3, and a pattern, which has a plurality of lead wires drawn from the mesh pattern MP and having a line width of 20 μm and a maximum lead wire length of 20 mm and is for an external connection terminal having a line width of 500 μm and a length of 3 mm, the silver halide-containing photosensitive layer prepared as above was exposed to parallel light from a high-pressure mercury lamp used as a light source. Hereinafter, the electrode having the mesh pattern MP obtained in this way will be called a mesh pattern electrode. In the mesh pattern electrode, the line width WA of the thin wire T constituting the square grid was 4 μm, and the interval WB between the thin wires T was 296 μm. That is, the arrangement pitch of the mesh cells C in the mesh pattern electrode was 300 μm.

After exposure, the photosensitive layer was subjected to development using the following developer, subjected to a fixing treatment using a fixer (trade name: N3X-R for CN16X: manufactured by FUJI FILM Corporation), and then rinsed with pure water, followed by drying, in this way, a 80 mm (length)×40 mm (width) sample (hereinafter, called a mesh pattern) was obtained which had a mesh pattern electrode having a thickness tc of 2.5 μm, a lead wire, and an external connection terminal.

(Composition of Developer)

The following compounds are contained in 1 liter (L) of the developer.

| | |
|---|---|
| Hydroquinone | 0.037 mol/L |
| N-methylaminophenol | 0.016 mol/L |
| Sodium metaborate | 0.140 mol/L |
| Sodium hydroxide | 0.360 mol/L |
| Sodium bromide | 0.031 mol/L |
| Potassium metabisulfite | 0.187 mol/L |

The obtained mesh sample was immersed in an aqueous solution of a protease (BIOPRASE AL-15FG manufactured by Nagase ChemteX Corporation.) (protease concentration: 0.5% by mass, liquid temperature: 40° C.) for 120 seconds. Each mesh sample was taken out of the aqueous solution, and washed by being immersed in warm water (liquid temperature: 50° C.) for 120 seconds.

(Reduction Treatment)

The mesh sample was immersed in the following reduction treatment liquid for 360 seconds, washed with pure water after immersion, and dried.

<Composition of Reduction Treatment Liquid>

The following compounds are contained in 1 liter (L) of the reduction treatment liquid.

| | |
|---|---|
| Hydroquinone | 0.20 mol/L |
| Potassium hydroxide | 0.45 mol/L |
| Potassium carbonate | 0.24 mol/L |

(Calendering Treatment)

As a mat member for a calendering treatment, a metal plate (stainless steel plate) having a surface shape with an arithmetic mean roughness Ra=0.28 µm and a mean interval of irregularities Sm=1.87 µm was used for a calendering treatment in which the mesh sample having a width of 6 cm was placed on the metal plate, a jack pressure of 11.4 MPa was applied thereto by a calendering machine consisting of a combination of a metal roller (diameter 95 mm) finished up with mirror surface processing and a resin roller (diameter 95 mm), and the sample was transported at a speed of 120 mm/min.

(Heating Treatment)

By using a superheated steam tank at a temperature of 120° C. a heating treatment was performed on the mesh sample for 130 seconds. As a result, a heat-treated mesh sample was obtained.

The mesh sample obtained as above comprised a 100 µm thick polyethylene terephthalate (PET) film, a mesh pattern electrode (width of fine metal wire: 4 µm, width of opening portion: 296 µm) disposed on one surface of the PET film, lead wires, and external connection terminals Hereinafter, the mesh pattern electrode, the lead wires, find the external connection terminals will be collectively called a conductive layer. The 100 µm thick PET film in the mesh sample corresponds to the temporary support 11 in an embodiment of the present invention, and the conductive layer in the mesh sample corresponds to the conductive layer 12 in an embodiment of the present invention.

The 50 µm thick peeling sheet of the pressure-sensitive adhesive sheet obtained as above was peeled off, and the pressure-sensitive adhesive sheet was bonded to the conductive layer of the mesh sample by using, a roller weighing 2 kg, thereby obtaining a transfer foil for a touch sensor of Example 1 in which a 75 µm thick peeling sheet was disposed on a conductive layer. The transfer foil for a touch sensor of Example 1 has a 100 µm thick PET film, a conductive layer disposed on the 100 µm thick PET film, and a pressure-sensitive adhesive disposed on the conductive layer. The 100 µm thick PET film, conductive layer, find pressure-sensitive adhesive of the transfer foil for a touch sensor of Example 1 correspond to the temporary support 11, the conductive layer 12 and the layer 13 to be bonded to a support of the transfer foil 1 for a touch sensor of the first embodiment of the present invention, respectively.

<Transfer>

The 75 µm thick peeling sheet disposed on a surface of the transfer foil for a touch sensor was peeled off, find the transfer foil for a touch sensor was bonded to a 38 µm thick PET film having the same size as the pressure-sensitive adhesive sheet by using a roller weighing 2 kg, thereby obtaining a laminate. By using a high-pressure constant-temperature tank, the obtained laminate was subjected to a defoaming treatment by being exposed to an environment of 40° C. and 5 atm for 20 minutes. Then, the 100 µm thick PET film was peeled from the conductive layer, thereby obtaining a conductive film for a touch sensor The conductive film for a touch sensor of Example 1 has a 38 µm thick PET film, a pressure-sensitive adhesive disposed on the 38 µm thick PET film, and a conductive layer bonded to the pressure-sensitive adhesive. The 38 µm thick PET film, pressure-sensitive adhesive, and conductive layer of the conductive film for a touch sensor of Example 1 correspond to the support 14, the layer 13 to be bonded to a support, and the conductive layer 12 of the conductive film 2 for a touch sensor in the first embodiment of the present invention, respectively.

<Bonding Step>

The external connection terminals of the conductive film for a touch sensor and a flexible print substrate were crimpled and joined using Anisotropic Conductive Film (ACF) (CP906AM-25AC) manufactured by Sony Chemicals Corporation under the conditions of 130° C., 1 MPa, and 10 seconds, thereby obtaining a joined sample.

Example 2

A transfer foil for a touch sensor of Example 2 was prepared in the same manner as in Example 1, except that in the pressure-sensitive adhesive sheet of Example 1, the amount of the esterification product (trade name UC102, manufactured by KURARAY CO, LTD., molecular weight 19,000) of an adduct of maleic acid anhydride of a polyisoprene polymer and 2-hydroxyethyl methacrylate was changed to 18.5 parts by mass, the amount of the polybutadiene (trade name Poluvest119, manufactured by Evonik Degussa GMBH) was changed to 10.5 parts by mass, and the amount of the terpene-based hydrogenated resin (trade name CLEARON P-135, manufactured by YASUHARA CHEMICAL CO, LTD) was changed to 41.3 parts by mass.

Furthermore, by performing a transfer step on the transfer foil for a touch sensor of Example 2 in the same mariner as in Example 1, a conductive film for a touch sensor of Example 2 was obtained In addition, by performing a bonding step on the conductive film for a touch sensor of Example 2 in the same manner as in Example 1, a joined sample of Example 2 was obtained.

Example 3

A transfer foil for a touch sensor of Example 3 was prepared in the same manner as in Example 1, except that in the pressure-sensitive adhesive sheet of Example 1, the amount of the esterificalion product (trade name UC102, manufactured by KURARAY CO., LTD., molecular weight 19,000) of an adduct of maleic acid anhydride of a polyisoprene polymer and 2-hydroxyethyl methacrylate was changed to 17.0 parts by mass, the amount of the polybutadiene (trade name Poluvest110, manufactured by Evonik Degussa GMBH) was changed to 9.0 parts by mass, and the amount of the terpene-based hydrogenated resin (trade name CLEARON P-135, manufactured by YASUHARA CHEMICAL CO, LTD) was changed to 44.3 parts by mass.

Furthermore, by performing a transfer step on the transfer foil for a touch sensor of Example 3 in the same manner as in Example 1, a conductive film for a touch sensor of Example 3 was obtained. In addition, by performing a bonding step on the conductive film for a touch sensor of Example 3 in the same manner as in Example 1, a joined sample of Example 3 was obtained.

Example 4

A transfer foil for a touch sensor of Example 4 was prepared in the same manner as in Example 1, except that in the pressure-sensitive adhesive sheet of Example 1, the amount of the esterification product (trade name UC102, manufactured by KURARAY CO., LTD., molecular weight 19.000) of an adduct of maleic acid anhydride of a polyisoprene polymer and 2-hydroxyethyl methacrylate was changed to 14.0 parts by mass, the amount of the poly butadiene (trade name Poluvest110, manufactured by Evonik Degussa GMBH) was changed to 7.0 parts by mass, and the amount of the terpene-based hydrogenated resin (trade name CLEARON P-135, manufactured by YASU-HARA CHEMICAL CO., LTD.) was changed to 49.3 parts by mass.

Furthermore, by performing a transfer step on the transfer foil for a touch sensor of Example 4 in the same manner as in Example 1, a conductive film for a touch sensor of Example 4 was obtained, in addition, by performing a bonding step on the conductive film for a touch sensor of Example 4 in the same manner as in Example 1, a joined sample of Example 4 was obtained.

Example 5

A transfer foil for a touch sensor of Example 5 was prepared in the same manner as in Example 1, except that the pressure-sensitive adhesive of Example 1 was applied up to a thickness of 5 μm.

Furthermore, by performing a transfer step on the transfer foil for a touch sensor of Example 5 in the same manner as in Example 1, a conductive film for a touch sensor of Example 5 was obtained In addition, by performing a bonding step on the conductive film for a touch sensor of Example 5 in the same manner as in Example 1, a joined sample of Example 5 was obtained.

Example 6

A transfer foil for a touch sensor of Example 6 was prepared in the same manner as in Example 1, except that in preparing, (be composition for forming a photosensitive layer of Example 1, half of the polymer represented by (P-1) was changed to a polymer represented by

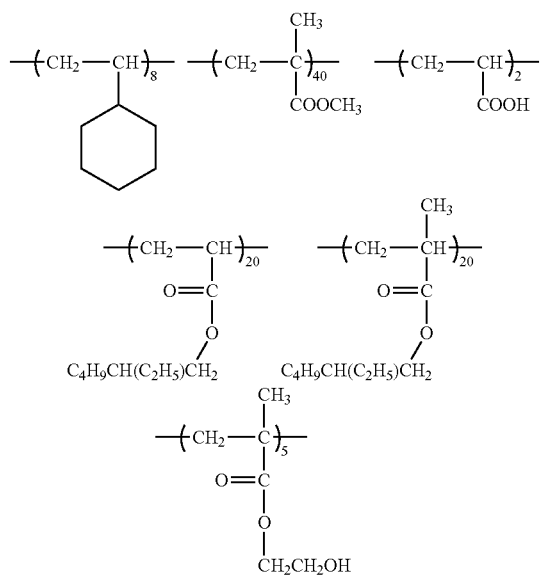

(P-2)

Furthermore, by performing a transfer step on the transfer foil for a touch sensor of Example 6 in the same manner as in Example 1, a conductive film for a touch sensor of Example 6 was obtained. In addition, by performing a bonding step on the conductive film for a touch sensor of Example 6 in the same manner as in Example 1, a joined sample of Example 6 was obtained.

Example 7

A transfer foil for a touch sensor of Example 7 was prepared in the same manner as in Example 1, except that in the photosensitive layer forming step of Example 1, the content of a polymer in the silver halide-containing photosensitive layer was set to 0.66 g/m$^2$.

Furthermore, by performing a transfer step on the transfer foil for a touch sensor of Example 7 in the same manner as in Example 1, a conductive film for a touch sensor of Example 7 was obtained. In addition, by performing a bonding step on the conductive film for a touch sensor of Example 7 in the same manner as in Example 1, a joined sample of Example 7 was obtained.

Example 8

A transfer foil for a touch sensor of Example 8 was prepared in the same manner as in Example 1, except that in the photosensitive layer forming step of Example 1, the content of a polymer in the silver halide-containing photosensitive layer was set to 0.44 g/m$^2$. Furthermore, by performing a transfer step on the transfer foil for a touch sensor of Example 8 in the same manner as in Example 1, a conductive film for a touch sensor of Example 8 was obtained. In addition, by performing a bonding step on the conductive film for a touch sensor of Example 8 in the same manner as in Example 1, a joined sample of Example 8 was obtained.

Example 9

A transfer foil for a touch sensor of Example 9 was prepared in the same manner as in Example 1, except that in the photosensitive layer forming step of Example 1, the content of a polymer in the silver halide-containing photosensitive layer was set to 0.22 g/m$^2$.

Furthermore, by performing a transfer step on the transfer foil for a touch sensor of Example 9 in the same manner as in Example 1, a conductive film for a touch sensor of Example 9 was obtained In addition, by performing a bonding step on the conductive film for a touch sensor of Example 9 in the same manner as in Example 1, a joined sample of Example 9 was obtained.

Example 10

A transfer foil for a touch sensor of Example 10 was prepared in the same manner as in Example 1, except that in the photosensitive layer forming step of Example 1, the content of a polymer in the silver halide-containing photosensitive layer was set to 0.11 g/m$^2$.

Furthermore, by performing a transfer step on the transfer foil for a touch sensor of Example 10 in the same manner as in Example 1, a conductive film for a touch sensor of Example 10 was obtained. In addition, by performing a bonding step on the conductive film for a touch sensor of Example 10 in the same manner as in Example 1, a joined sample of Example 10 was obtained.

Example 11

A transfer foil for a touch sensor of Example 11 was prepared in the same manner as in Example 1, except that in the exposure development treatment of Example 1, the mesh pattern MP was changed to a mesh pattern having arrays of a plurality of square grids in which a width WA of the thin wire T is 1.0 μm and an interval WB between the Thin wires T is 299 μm.

Furthermore, by performing a transfer step on the transfer foil for a touch sensor of Example 11 in the same manner as in Example 1, a conductive film for a touch sensor of Example 11 was obtained In addition, by performing a bonding step on the conductive film for a touch sensor of Example 11 in the same manner as in Example 1, a joined sample of Example 11 was obtained.

Example 12

A transfer foil for a touch sensor of Example 12 was prepared in the same manner as in Example 1, except that in the exposure development treatment of Example 1, the mesh pattern MP was changed to a mesh pattern consisting of arrays of a plurality of square grids in which a width WA of the thin wire T is 4.5 μm and an interval WB between the Thin wires T is 295.5 μm.

Furthermore, by performing a transfer step on the transfer foil for a touch sensor of Example 12 in the same manner as in Example 1, a conductive film for a touch sensor of Example 12 was obtained. In addition, by performing a bonding step on the conductive film for a touch sensor of Example 12 in the same manner as in Example 1, a joined sample of Example 12 was obtained.

Example 13

A transfer foil for a touch sensor of Example 13 was prepared in the same manner as in Example 1, except that in Example 1, the conductive layer was coated with a UV-curable adhesive TB3074C (manufactured by ThreeBond Holdings Co., Ltd.) up to a thickness of 5 μm, instead of being bonded to a pressure-sensitive adhesive sheet. The UV-curable adhesive obtained in this way corresponds to the layer 13 to be bonded to a support in the first embodiment of the present invention. Furthermore, the following transfer step was performed on the transfer foil for a touch sensor of Example 13.
<Transfer>

A 38 μm thick PET film was bonded to a surface of the transfer foil for a touch sensor, the surface coated with the UV-curable adhesive TB3074C, and irradiated with ultraviolet rays by using an air-cooled metal halide lamp (manufactured by EYE GRAPHICS CO, LTD.) at an illuminance of 400 mW/cm$^2$ and an irradiation dose of 1,000 mJ/cm$^2$ so that (be UV-curable adhesive TB3074C was cured. Then, the 100 μm thick PET film was peeled from the conductive layer, thereby obtaining a conductive film for a touch sensor of Example 13.

The conductive film for a touch sensor of Example 13 has a 38 μm thick PET film, a UV-curable adhesive disposed on the 38 μm thick PET film, and a conductive layer stuck to the UV-curable adhesive. The 38 μm thick PET film, UV-curable adhesive, and conductive layer of the conductive film for a touch sensor of Example 13 correspond to the support 14, the layer 13 to be bonded to a support, and the conductive layer 12 of the conductive film 2 for a touch sensor in the first embodiment of the present invention, respectively.

In addition, by performing a bonding step on the obtained conductive film for a touch sensor of Example 13 in the same manner as in Example 1, a joined sample of Example 13 was obtained.

Example 14

A transfer foil for a touch sensor of Example 14 was prepared in the same manner as in Example 13, except that the UV-curable adhesive of Example 13 was applied up to a thickness of 10 μm.

Furthermore, by performing a transfer step on the transfer foil for a touch sensor of Example 14 in the same manner as in Example 13, a conductive film for a touch sensor of Example 14 was obtained In addition, by performing a bonding step on the conductive film for a touch sensor of Example 14 in the same manner as in Example 1, a joined sample of Example 14 was obtained.

Example 15

The conductive layer of the mesh sample in Example 1 was coated with the UV-curable adhesive TB3074C (manufactured by ThreeBond Holdings Co., Ltd) up to a thickness of 5 μm. Then, the 50 μm thick peeling sheet of the pressure-sensitive adhesive sheet in Example 1 was peeled off, the pressure-sensitive adhesive sheet was disposed on the UV-curable adhesive with which the conductive layer was coated, and the conductive layer and the pressure-sensitive adhesive sheet were bonded by using a roller weighing 2 kg. Furthermore, by using an air-cooled metal halide lamp (manufactured by EYE GRAPHICS CO., LTD.), the laminate consisting of the conductive layer, the UV-curable adhesive, and the pressure-sensitive adhesive of the pressure-sensitive adhesive sheet was irradiated with ultraviolet rays at an illuminance of 400 mW/cm$^2$ and an irradiation dose of 1,000 ml/cm$^2$ so that the UV-curable adhesive was cured, thereby obtaining a transfer foil for a touch sensor of Example 15. The layer consisting of the pressure-sensitive adhesive and the UV-curable adhesive in Example 15 corresponds to the layer 13A to be bonded to a support in the second embodiment.

Furthermore, by performing a transfer step on the transfer foil for a touch sensor of Example 15 in the same manner as in Example 1, a conductive film for a touch sensor of Example 15 was obtained, in addition, by performing a bonding step on the conductive film for a touch sensor of Example 15 in the same manner as in Example 1, a joined sample of Example 15 was obtained.

Example 16

A transfer foil for a touch sensor of Example 16 was prepared in the same manner as in Example 15, except that the pressure-sensitive adhesive of Example 15 was applied up to a thickness of 5 μm.

Furthermore, by performing a transfer step on the transfer foil for a touch sensor of Example 16 in the same manner as in Example 1, a conductive film for a touch sensor of Example 16 was obtained. In addition, by performing a bonding step on the conductive film for a touch sensor of Example 16 in the same manner as in Example 1, a joined sample of Example 16 was obtained.

Example 17

The same transfer foil for a touch sensor as in Example 16 was subjected to the transfer step of Example 1. Then, instead of a 38 μm thick PET film, the following 30 μm thick polyimide film with a hardcoat was bonded 10 the transfer foil for a touch sensor, thereby obtaining a conductive film for a touch sensor of Example 17.

<Preparation of Polyimide Film with Hardcoat>
(Manufacturing of Polyimide Powder)

Under a nitrogen stream, 832 g of N,N-dimethylacetamide (DMAc) was added to a 1 L reactor equipped with a stirrer, a nitrogen injection device, a dropping funnel, a temperature controller, and a cooler, and then the temperature of the reactor was set to 25° C. Bistrifluoromethyl benzidine (TFDB) (64.046 g (0.2 mol)) was added thereto and dissolved. The obtained solution was kept at 25° C., and in this state, 31.00 g (0.07 mol) of 2,2-bis(3,4-dicarboxyphenyl)hexafluoropropane dianhydride (6FDA) and 8.83 g (0.03 mol) of biphenyltetracarboxylic dianhydride (BPDA) were added thereto, and the mixture was allowed to react by being stirred for a certain period of time. Then, 20.302 g (0.1 mol) of terephthaloyl chloride (TPC) was added thereto, thereby obtaining a polyamic acid solution with a concentration of solid contents of 13% by mass. Thereafter, 25.6 g of pyridine and 33.1 g of acetic anhydride were added to the polyamic acid solution, and the mixture was stirred for 30 minutes, further stirred at 70° C. for 1 hour, and then cooled to room temperature. Methanol (20 L) was added thereto, and the precipitated solid contents were filtered and ground Subsequently, the ground resultant was dried in a vacuum at 100° C. for 6 hours, thereby obtaining 111 g of polyimide powder.

(Preparation of Substrate S-1)

The aforementioned polyimide powder (100 g) was dissolved in 670 g of N,N-dimethylacetamide (DMAc), thereby obtaining a 13% by mass solution. The obtained solution was cast on a stainless steel plate and dried with hot air at 130° C. for 30 minutes. Then, the film was peeled from the stainless steel plate and fixed to a frame by using pins, and the frame to which the film was fixed was put in a vacuum oven, heated for 2 hours by slowly increasing the heating temperature up to 300° C. from 100° C., and then slowly cooled. The cooled film was separated from the frame. Then, as a final heat treatment step, the film was further treated with heal for 30 minutes at 300° C., thereby obtaining a substrate S-1 having a film thickness of 30 μm consisting of a poly made film.

(Preparation of composition HC-1 for forming hardcoat layer)

A surfactant (Z-1), IRGACURE 127, and PGME were abided to a propylene glycol monomethyl ether (PGME) solution of polyorganosilsesquioxane (SQ2-1) (concentration of solid contents: 35% by mass), and the content of each component contained in the solution was adjusted as below. The solution was put in a mixing tank and stirred. The obtained composition was filtered through a polypropylene filter having a pore size of 0.45 μm, thereby obtaining a composition HC-1 for forming a hardcoat layer.

| | |
|---|---|
| Surfactant (Z-1) | 0.04 parts by mass |
| IRGACURE 127 | 0.9 parts by mass |
| PGME | 6.7 parts by mass |

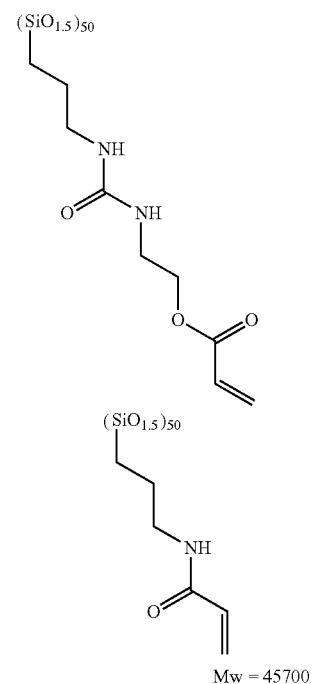

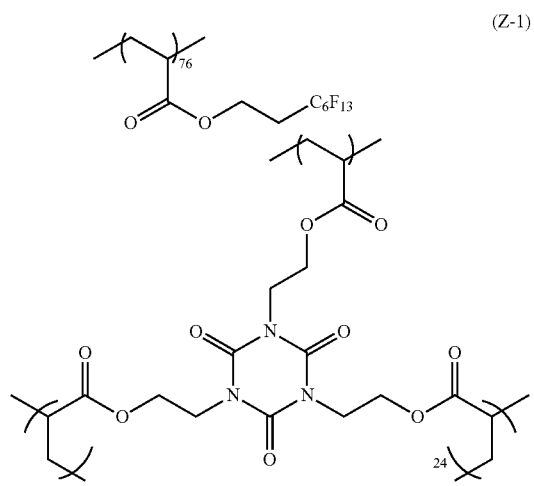

Here, the ratio (76% and 24%) of each constitutional unit in (Z-1) is a mass ratio.

IRGACURE 127 (Irg. 127) is a radical polymerization initiator manufactured by IGM Resin B.V.

(Manufacturing of Hardcoat Film)

The polyimide substrate S-1 having a thickness of 30 μm was coated with the composition HC-1 (or forming a hardcoat layer by using a #30 wire bar so that the film thickness was 14 μm after curing, thereby providing hardcoat layer coating film on the substrate.

Thereafter, the hardcoat layer coating film was dried at 120° C. for 1 minute and then irradiated with ultraviolet rays at an illuminance of 60 mW/cm$^2$ and an irradiation dose of 600 mJ/cm$^2$ by using an air-cooled mercury lamp under the conditions of 25° C. and an oxygen concentration of 100 ppm (parts per million). By curing the hardcoat layer coating film in this way, a polyimide film with a hardcoat was obtained

Comparative Example 1

A transfer foil for a touch sensor of Comparative Example 1 was prepared in the same manner as in Example 1, except that in the pressure-sensitive adhesive sheet of Example 1, the amount of the esterification product (trade name UC102, manufactured by KURARAY CO., LTD., molecular weight 19,000) of an adduct of maleic acid anhydride of a polyisoprene polymer and 2-hydroxy ethyl methacrylate was changed to 10.0 parts by mass, the amount of the poly butadiene (trade name Poluvest110, manufactured by Evonik Degussa GMBH) was changed to 4.0 parts by mass, and the amount of the terpene-based hydrogenated resin (trade name CLEARON P-135, manufactured by YASUHARA CHEMICAL CO, LTD) was changed to 56.3 parts by mass.

Furthermore, by performing a transfer step on the transfer foil for a touch sensor of Comparative Example 1 in the same manner as in Example 1, a conductive film for a touch sensor of Comparative Example 1 was obtained. In addition, by performing a bonding step on the conductive film for a touch sensor of Comparative Example 1 in the same manner as in Example 1, a joined sample of Comparative Example 1 was obtained.

Comparative Example 2

A transfer foil for a touch sensor of Comparative Example 2 was prepared in the same manner as in Example 1, except that the pressure-sensitive adhesive of Example 1 was applied up to a thickness of 25 μm.

Furthermore, by performing a transfer step on the transfer foil for a touch sensor of Comparative Example 2 in the same manner as in Example 1, a conductive film for a touch sensor of Comparative Example 2 was obtained In addition, by performing a bonding step on the conductive film for a touch sensor of Comparative Example 2 in the same manner as in Example 1, a joined sample of Comparative Example 2 was obtained.

Comparative Example 3

A transfer foil for a touch sensor of Comparative Example 3 was prepared in the same manner as in Example 1, except that in preparing the composition for forming a photosensitive layer of Example 1, all of the polymer represented by (P-1) was changed to a polymer represented by (P-2).

Furthermore, by performing, a transfer step on the transfer foil for a touch sensor of Comparative Example 3 in the same manner as in Example 1, a conductive film for a touch sensor of Comparative Example 3 was obtained In addition, by performing a bonding step on the conductive film for a touch sensor of Comparative Example 3 in the same manner as in Example 1, a joined sample of Comparative Example 3 was obtained.

Comparative Example 4

A transfer foil for a touch sensor of Comparative Example 4 was prepared in the same manner as in Example 13, except that a UV-curable adhesive NOA71 (manufactured by Norland Products. Inc.) was used instead of the UV-curable adhesive TB3074C of Example 13.

Furthermore, by performing a transfer step on the transfer foil for a touch sensor of Comparative Example 4 in the same manner as in Example 13, a conductive film for a touch sensor of Comparative Example 4 was obtained In addition, by performing a bonding step on the conductive film for a touch sensor of Comparative Example 4 in the same manner as in Example 1, a joined sample of Comparative Example 4 was obtained.

For the pressure-sensitive adhesive sheets, mesh samples having undergone a heating treatment, transfer foils for a touch sensor, conductive films for a touch sensor, and joined samples of Examples 1 to 17 and Comparative Examples 1 to 4 obtained as above, the following evaluations were carried out.

<Measurement of Modulus of Elasticity (Pressure-sensitive Adhesive)>

In Examples 1 to 12 and Comparative Examples 1 to 3, a peeling sheet was peeled from the 5 mm (width)×25 mm (length) pressure-sensitive adhesive sheet, and the peeling sheets were stacked and bonded, thereby preparing a 150 μm thick sample consisting of only the pressure-sensitive adhesive layer. Then, the sample was set in a device (DVA-225 manufactured by IT Instrument and Control Co., Ltd.) at an inter-chuck distance of 20 mm and left for 1 hour in an environment of 130° C., and in the environment (temperature 130° C.), the modulus of elasticity of the sample was measured according to JIS K7244 in a tensile mode under the condition of a measurement frequency of 1 Hz.

<Measurement of Modulus of Elasticity (UV-Curable Adhesive)>

In Examples 13 and 14 and Comparative Example 4, the peeling sheet was coated with the UV-curable adhesive. By using an air-cooled metal halide lamp (manufactured by EYE GRAPHICS CO., LTD.), the peeling sheet coated with the UV-curable adhesive was irradiated with ultraviolet rays at an illuminance of 400 mW/cm$^2$ and an irradiation dose of 1.000 mJ/cm$^2$ so that the UV-curable adhesive was cured. The film formed of the cured UV-curable adhesive was peeled from the peeling sheet and cut in a size of 5 mm (width)×25 mm (length), thereby preparing a sample. Then, the sample was set in a device (DVA-225 manufactured by IT Instrument and Control Co., Ltd.) at an inter-chuck distance of 20 mm and left for 1 hour in an environment of 130° C., and in the environment (temperature 130° C.), the modulus of elasticity of the sample was measured according to JIS K7244 in a tensile mode under the condition of a measurement frequency of 1 Hz.

<Measurement of Modulus of Elasticity (Pressure-sensitive Adhesive Layer and UV-Curable Adhesive)>

In Examples 15 to 17, the 5 mm (width)×25 mm (length) peeling sheet was coated with the UV-curable adhesive up to a thickness of 5 μm. Furthermore, a peeling sheet was peeled from the 5 mm (width)×25 mm (length) pressure-sensitive adhesive sheet, and the pressure-sensitive adhesive sheets were stacked and bonded In this way, a 15 μm thick sample consisting of only a pressure-sensitive adhesive layer was prepared in Example 15, and a 5 μm thick sample consisting of only a pressure-sensitive adhesive layer was prepared in Examples 16 and 17. Each of these samples was disposed on the UV-curable adhesive with which the peeling sheet was coated, thereby preparing a laminate consisting of a peeling sheet, a UV-curable adhesive, and a pressure-sensitive adhesive. Thereafter, by using an air-cooled metal halide lamp (manufactured by EYE GRAPHICS CO., LTD.), the prepared laminate was irradiated with ultraviolet rays at an illuminance of 400 mW/cm$^2$ and an irradiation dose of 1,000 mJ/cm$^2$ so that the UV-curable adhesive was cured. The film formed of the cured UV-curable adhesive was peeled from the peeling sheet, thereby obtaining a sample which is a laminate of a film formed of a cured UV-curable adhesive and a pressure-sensitive adhesive. The sample obtained as above was set in a device (DVA-225 manufactured by IT Instrument and Control Co., Ltd.) at an inter-chuck distance of 20 mm and left in an environment of 130° C. for 1 hour, and in the environment (temperature 130° C.), the modulus of elasticity of the sample was measured according to JIS K7244 in a tensile mode under the condition of a measurement frequency of 1 Hz.

<Stretch Resistance Evaluations>

The 80 mm (length)×40 mm (width) mesh sample having undergone a heating treatment was set in a tensilon device (RTF-1310 manufactured by A&D Company, Limited.) in the machine direction at an inter-chuck distance of 35 mm and left for 1 hour in an environment at a temperature of 130° C. In the environment (temperature 130° C.), the mesh sample (mesh pattern electrode) was stretched by 2.5%. Then, thin wire T at the central portion (site approximately corresponding to center in both the machine and transverse directions, for example, a site that is 40 mm distant from one end portion of the machine direction along the machine direction and 20 mm distant from one end portion of the transverse direction along the transverse direction) of the mesh sample was observed, and stretch resistance of the mesh sample was evaluated according to the following standard. The evaluation grades A, B, C, and D are levels having no problem in practical use.

"A": In a 1 mm×1 mm square region of the mesh pattern electrode positioned at the central portion of the mesh sample, the thin wire T is not broken, and the number of sites where the thin wire T is bent is zero.

"B": In a 1 mm×1 mm square region of the mesh pattern electrode positioned at the central portion of the mesh sample, the thin wire T is not broken, and the number of sites where the thin wire T is bent is 1 or more and less than 3.

"C": In a 1 mm×1 mm square region of the mesh pattern electrode positioned at the central portion of the mesh sample, the thin wire T is not broken, and the number of sites where the thin wire T is bent is 3 or more and less than 5.

"D": In a 1 mm×1 mm square region of the mesh pattern electrode positioned at the central portion of the mesh sample, the thin wire T is not broken, and the number of sites where the thin wire T is bent is 5 or more.

"E": In a 1 mm×1 mm square region of the mesh pattern electrode positioned at the central portion of the mesh sample, the thin wire T is broken.

<Measurement of Peel Adhesion (Pressure-sensitive Adhesive)>

From each of the 40 mm×80 mm transfer foil for a touch sensor of Examples 1 to 12. Examples 15 to 17, and Comparative Examples 1 to 3, the 75 µm thick peeling sheet disposed on a surface of the transfer foil for a touch sensor was peeled off. Then, the transfer foil for a touch sensor was bonded to 40 mm (width)×30 mm (length)×25 µm (thickness) polyimide sheet (KAPTON 100H) by matching the width direction, and the opposite surface of the polyimide sheet was bonded to a 40 mm (width)×50 mm (length)×2 mm (thickness) glass plate by using OCAS 146-3 (manufactured by 3M). The obtained laminate was subjected to pressure defoaming treatment for 60 minutes at 40° C. and 5 atm. Then, the laminate was left at room temperature (about 23° C.) for one day, thereby preparing a sample for peel adhesion evaluation. The sample obtained in this way has a glass plate, OCA8146-3 disposed on the glass plate, a polyimide sheet disposed on OCA8146-3, a pressure-sensitive adhesive disposed on the polyimide sheet, a conductive layer disposed on the pressure-sensitive adhesive, and a 100 µm thick PET film disposed on the conductive layer.

The sample was set in a tensilon device so that one end of the 100 µm thick PET film in the sample prepared as above was held by the device, and the sample was left to stand in an environment of 25° C. for 30 minutes. Thereafter, the sample was subjected to a so-called 180° peel test in which one end of the 100 µm thick PET film was stretched at a speed of 300 mm/sec in one direction which was orthogonal to the lamination direction of the sample and continued to the other end from one end of the sample. The peel adhesion between the 100 µm thick PET film and the conductive layer during the test was measured.

<Measurement of Peel Adhesion (UV-Curable Adhesive)>

Each of the transfer foils for a touch sensor of Examples 13 and 14 and Comparative Example 4 was cut in a size of 40 mm×80 mm, and a 40 mm (width)×30 mm (length)×25 µm (thickness) polyimide sheet (KAPTON 100H) was bonded to a surface of the transfer foil for a touch sensor, the surface coated with the UV-curable adhesive, by matching the width direction. By using an air-cooled metal halide lamp (manufactured by EYE GRAPHICS CO., LTD.), the transfer foil for a touch sensor bonded to the polyimide sheet was irradiated with ultraviolet rays at an illuminance of 400 mW/cm$^2$ and an irradiation does of 1,000 mJ/cm$^2$ so that the UV-curable adhesive was cured. The opposite surface of the polyimide sheet of the sample was bonded to a glass plate (40 mm (width)×50 mm (length)×2 mm (thickness); by using OCA8146-3 (manufactured by 3M), and the sample was subjected to a pressure defoaming treatment for 60 minutes at 40° C. and 5 atm. Then, the laminate was left at room temperature (about 23° C.) for one day, thereby preparing a sample for peel adhesion evaluation.

The sample obtained in this way has a glass plate, OCA8146-3 disposed on the glass plate, a polyimide sheet disposed on OCA8146-3, a UV-curable adhesive having undergone a curing treatment disposed on the polyimide sheet, a conductive layer disposed on the UV-curable adhesive having undergone a curing treatment, and a 100 µm thick PET film disposed on the conductive layer.

The sample was set in a tensilon device so that one end of the 100 µm thick PET film in the sample prepared as above was held by the device, and the sample was left to stand in an environment of 25° C. for 30 minutes Thereafter, the sample was subjected to a so-called 180° peel test in which one end of the 100 µm thick PET film was stretched at a speed of 300 mm/sec. The peel adhesion between the 100 µm thick PET film and the conductive layer during the test was measured.

<Evaluation of Breaking after Transfer>

The breaking of the thin wire T at the central portion (site approximately corresponding to center in both the machine and transverse directions, for example, a site that is 40 mm distant from one end portion of the machine direction along the machine direction and 20 mm distant from one end portion of the transverse direction along the transverse direction) of the mesh pattern electrode in the 80 mm (length)×40 mm (width) conductive film for a touch sensor was evaluated according to the following standard. The evaluation grades A. B. C, and D are levels having no problem in practical use.

"A": In a 1 mm×1 mm square region of the mesh pattern electrode positioned at the central portion of the mesh sample, the thin wire T is not broken, and the number of sites where (be thin wire T is bent is zero.

"B": In a 1 mm×1 mm square region of the mesh pattern electrode positioned at the central portion of the mesh sample, the thin wire T is not broken, and the number of sites where the thin wire T is bent is 1 or more and less than 3.

"C": In a 1 mm×1 mm square region of the mesh pattern electrode positioned at the central portion of the mesh sample, the thin wire T is not broken, and the number of sites where the thin wire T is bent is 3 or more and less than 5.

"D": In a 1 mm×1 mm square region of the mesh pattern electrode positioned at the central portion of the mesh sample, the thin wire T is not broken, and the number of sites where the thin wire T is bent is 5 or more.

"E": In a 1 mm×1 mm square region of the mesh pattern electrode positioned at the central portion of the mesh sample, the thin wire T is broken.

<Bend Resistance Evaluation>

Each conductive film for a touch sensor was set in a cylindrical mandrel bending tester manufactured by COTEC, and a bending test was performed 20 times on the conductive film for a touch sensor by using a cylindrical mandrel having a diameter of 10 mm. At this time, the conductive film for a touch sensor was bent so that the central portion of the mesh pattern electrode in the conductive film for a touch sensor was bent in the width direction of the conductive film for a touch sensor Furthermore, the change in resistance at the central portion of the mesh pattern electrode of the conductive film for a touch sensor before and after the bending test performed 20 times (surface resistance R after bending test/surface resistance R0 before bending test) was measured, and based on the measured resistance change R/R0 of the conductive film for a touch sensor, bend resistance of the conductive film for a touch sensor was evaluated according to the following standard. The surface resistance of the conductive film for a touch sensor was measured using Loresta-GP MCP-T600 manufactured by Mitsubishi Chemical Corporation. The smaller the change in surface resistance, that is, the closer R/R0 is to 1, the better the flexibility. The evaluation grades A, B, C, and D are levels having no problem in practical use.

"A": R/R0 is 0.9 or more and less than 1.1.

"B": R/R0 is 1.1 or more and less than 1.2, or 0.8 or more and less than 0.9.

"C": R/R0 is 1.2 or more and less than 1.3, or 0.7 or more and less than 0.8.

"D": R/R0 is 1.3 or more and less than 1.5, or 0.6 or more and less than 0.7.

"E": R/R0 is 1.5 or more or less than 0.6.

<Evaluation of Breaking of External Connection Terminal>

The breaking of the external connection terminals, each having a line width of 500 μm and a length of 3 mm, of the obtained joined sample was evaluated according to the following standard. The evaluation grades A, B, C, and D are levels having no problem in practical use "A": Neither breaking nor wiring loss occurs in the external connection terminals.

"B": No breaking occurs in the external connection terminals, and the number of sites where wiring loss occurs in the external connection terminals is 1 or more and less than 3.

"C": No breaking occurs in the external connection terminals, and the number of sites where wiring loss occurs in the external connection terminals is 3 or more and less than 5.

"D": No breaking occurs in the external connection terminals, and the number of sites where wiring loss occurs in the external connection terminals is 5 or more "E": Breaking occurs in the external connection terminals.

The wiring loss means a state where the external connection terminals are not totally broken, but some of the external connection terminals are lost.

The results of these evaluations are shown in the following Table 1.

TABLE 1

| | Type of layer to be bonded to support | Thickness of layer to be bonded to support | Mass ratio of resin material to conductive material | Peel adhesion between 100 μm thick PET film and conductive layer | Modulus of elasticity of layer to be bonded to support at 130° C. | Width of thin wire forming mesh pattern of detection electrode |
|---|---|---|---|---|---|---|
| Example 1 | Pressure-sensitive adhesive | 15 μm | 0.15 | 0.01 N/mm | 0.22 MPa | 4.0 μm |
| Example 2 | Pressure-sensitive adhesive | 15 μm | 0.15 | 0.01 N/mm | 0.20 MPa | 4.0 μm |
| Example 3 | Pressure-sensitive adhesive | 15 μm | 0.15 | 0.01 N/mm | 0.15 MPa | 4.0 μm |
| Example 4 | Pressure-sensitive adhesive | 15 μm | 0.15 | 0.01 N/mm | 0.10 MPa | 4.0 μm |
| Example 5 | Pressure-sensitive adhesive | 5 μm | 0.15 | 0.01 N/mm | 0.22 MPa | 4.0 μm |
| Example 6 | Pressure-sensitive adhesive | 15 μm | 0.15 | 0.15 N/mm | 0.22 MPa | 4.0 μm |
| Example 7 | Pressure-sensitive adhesive | 15 μm | 0.11 | 0.01 N/mm | 0.22 MPa | 4.0 μm |
| Example 8 | Pressure-sensitive adhesive | 15 μm | 0.07 | 0.01 N/mm | 0.22 MPa | 4.0 μm |
| Example 9 | Pressure-sensitive adhesive | 15 μm | 0.04 | 0.01 N/mm | 0.22 MPa | 4.0 μm |
| Example 10 | Pressure-sensitive adhesive | 15 μm | 0.02 | 0.01 N/mm | 0.22 MPa | 4.0 μm |
| Example 11 | Pressure-sensitive adhesive | 15 μm | 0.15 | 0.01 N/mm | 0.22 MPa | 1.0 μm |
| Example 12 | Pressure-sensitive adhesive | 15 μm | 0.15 | 0.01 N/mm | 0.22 MPa | 4.5 μm |
| Example 13 | UV-curable adhesive | 5 μm | 0.15 | 0.15 N/mm | 0.40 MPa | 4.0 μm |
| Example 14 | UV-curable adhesive | 15 μm | 0.15 | 0.17 N/mm | 0.40 MPa | 4.0 μm |
| Example 15 | Pressure-sensitive adhesive UV-curable adhesive | 5 μm 15 μm | 0.15 | 0.01 N/mm | 0.28 MPa | 4.0 μm |
| Example 16 | Pressure-sensitive adhesive UV-curable adhesive | 5 μm 5 μm | 0.15 | 0.01 N/mm | 0.33 MPa | 4.0 μm |
| Example 17 | Pressure-sensitive adhesive UV-curable adhesive | 5 μm 5 μm | 0.15 | 0.01 N/mm | 0.33 MPa | 4.0 μm |
| Comparative Example 1 | Pressure-sensitive adhesive | 15 μm | 0.15 | 0.01 N/mm | 0.08 MPa | 4.0 μm |
| Comparative Example 2 | Pressure-sensitive adhesive | 25 μm | 0.15 | 0.01 N/mm | 0.22 MPa | 4.0 μm |

TABLE 1-continued

| | | | | | | |
|---|---|---|---|---|---|---|
| Comparative Example 3 | Pressure-sensitive adhesive | 15 μm | 0.15 | 0.25 N/mm | 0.22 MPa | 4.0 μm |
| Comparative Example 4 | UV-curable adhesive | 5 μm | 0.15 | 0.25 N/mm | 0.30 MPa | 4.0 μm |

| | Transfer support | Evaluation of stretch resistance | Evaluation of breaking after transfer | Evaluation of breaking of external connection terminal | Evaluation of bend resistance |
|---|---|---|---|---|---|
| Example 1 | 38 μm thick PET | A | A | B | B |
| Example 2 | 38 μm thick PET | A | A | B | B |
| Example 3 | 38 μm thick PET | A | A | C | B |
| Example 4 | 38 μm thick PET | A | A | D | B |
| Example 5 | 38 μm thick PET | A | B | A | A |
| Example 6 | 38 μm thick PET | A | C | B | B |
| Example 7 | 38 μm thick PET | B | A | B | C |
| Example 8 | 38 μm thick PET | C | B | B | C |
| Example 9 | 38 μm thick PET | D | C | B | D |
| Example 10 | 38 μm thick PET | D | D | B | D |
| Example 11 | 38 μm thick PET | A | A | B | B |
| Example 12 | 38 μm thick PET | A | A | B | B |
| Example 13 | 38 μm thick PET | A | B | A | B |
| Example 14 | 38 μm thick PET | A | C | A | C |
| Example 15 | 38 μm thick PET | A | A | A | A |
| Example 16 | 38 μm thick PET | A | A | A | A |
| Example 17 | 30 μm thick polymimde | A | A | A | A |
| Comparative Example 1 | 38 μm thick PET | A | A | E | B |
| Comparative Example 2 | 38 μm thick PET | A | A | D | E |
| Comparative Example 3 | 38 μm thick PET | A | E | B | B |
| Comparative Example 4 | 38 μm thick PET | A | E | A | C |

As shown in Table 1, in all of Examples 1 to 14, the peel adhesion between the 100 μm thick PET film and the conductive layer was 0.17 N/mm or less, the modulus of elasticity of the layer to be bonded to a support was 0.10 MPa or more at 130° C., the evaluation grade of breaking after transfer was D or higher and the evaluation grade of breaking of external connection terminals was D or higher. These results show that in Examples 1 to 14, because the peel adhesion between the 100 μm thick PET film and the conductive layer is low enough, the breaking of the mesh pattern electrode is sufficiently prevented in a case where an attempt is made to peel the 100 μm thick PET film from the conductive layer. The results also show that because the layer to be bonded to a support has a high enough modulus of elasticity at 130° C., in a case where the external connection terminals and a flexible print substrate are connected to each other, the external connection terminals are inhibited from being displaced in the lamination direction of the conductive film for a touch sensor, find the breaking of the external connection terminals is fully prevented accordingly.

In Examples 15 to 17 which have both the UV-curable adhesive and the pressure-sensitive adhesive as the layer to be bonded to a support, the peel adhesion between the 100 μm thick PET film and the conductive layer was 0.01 N/mm, the layers to be bonded to a support of Examples 15, 16, and 17 had a modulus of elasticity of 0.28 MPa, 0.33 MPa and 0.33 MPa at 130° C. respectively, and the evaluation grades of stretch resistance, breaking after transfer, breaking of external connection terminals, and bend resistance were A for all the examples.

As a result of comparison of Examples 1 to 4, it was found that the modulus of elasticity of the layer to be bonded to a support at 130° C. was 0.22 MPa in Example 1, 0.20 MPa in Example 2, 0.17 MPa in Example 3, and 0.10 MPa in Example 4, the evaluation grade of breaking of external connection terminals was B in Examples 1 and 2, C in Example 3, and D in Example 4; the evaluation grade of stretch resistance and breaking after transfer was A in all of Examples 1 to 4, and the evaluation grade of bend resistance was B in all of Examples 1 to 4 These evaluation results show that the higher the modulus of elasticity of the layer to be bonded to a support at 130° C. the more difficult it is for the external connection terminals to be broken in a case where the external connection terminals and a flexible print substrate are connected to each other by a thermocompression method.

By the comparison between Examples 1 and 5, it was found that the thickness of the layer to be bonded to a support was 15 μm in Example 1 and 5 μm in Example 5, the evaluation grade of breaking after transfer was A in Example 1 and B in Example 5, the evaluation grade of breaking of external connection terminals was B in Example 1 and A in example 5; the evaluation grade of bend resistance was B in Example 1 and A in Example 5; and the evaluation grade of stretch resistance was A in both the Examples 1 and 5. These evaluation results show that the thicker the layer to be bonded to a support, the more difficult it is for the mesh pattern electrode to be broken in a case where an attempt is made to peel the 100 μm thick PET film from the conductive layer, white the thinner the layer to be bonded to a support, the more difficult it is for the external connection terminals to be broken in a case where the external connection terminals and a flexible print substrate are connected to each other by a thermocompression method, and the bend resistance is further improved as well. However, in a case where the thickness of the layer to be bonded to a support was 15 µm or less, the evaluation grade of breaking after transfer, breaking of external connection terminals, and bend resistance was excellent, which was B or higher, in both the examples.

By the comparison between Examples 1 and 6, it was found that the peel adhesion between the 100 µm thick PET film and the conductive layer was 0.01 N/mm in Example 1 and 0.15 N/mm in Example 6; the evaluation grade of breaking after transfer was A in Example 1 and C in Example 6, the evaluation grade of stretch resistance was A in both the Examples 1 and 6, and the evaluation grade of breaking of external connection terminals and bend resistance was B in both the Examples 1 and 6. These results show that the lower the peel adhesion between the 100 µm thick PET film and the conductive layer, the more difficult it is for the mesh pattern electrode to be broken break in a case where an attempt is made to peel the 100 µm thick PET film from the conductive layer.

By the comparison of Examples 1 and 7 to 10, it was found that the polymer content in the silver halide-containing photosensitive layer was 0.88 g/m² in Example 1, 0.66 g/m² in Example 7, 0.44 g/m² in Example 8, 0.22 g/m² in Example 9, and 0.11 g/m² in Example 10. In all of Examples 1 and 7 to 10, the amount of silver in the silver halide-containing photosensitive layer was 6 g/m². Therefore, the mass ratio of a polymer to silver in the silver halide-containing photosensitive layer was 0.15 in Example 1, 0.11 in Example 7, 0.07 in Example 8, 0.04 in Example 9, and 0.02 in Example 10.

The evaluation grade of stretch resistance was A evaluation in Example 1, B in Example 7, C in Example 8, and D in Examples 9 and 10. The evaluation grade of breaking after transfer was A in Examples 1 and 7, B in Example 8. C in Example 9, and 1) in Example 10. The evaluation grade of bend resistance was 8 in Example 1, C in Examples 7 and 8, and D in Examples 9 and 10. These evaluation results show that the higher the mass ratio of a polymer to silver in the silver halide-containing photosensitive layer, the more difficult it is for the mesh pattern electrode to be broken in a case where an attempt is made to peel the 100 µm thick PET film from the conductive layer, and the stretch resistance and bend resistance of the mesh pattern electrode are further improved.

By the comparison of Examples 1, 11, and 12, it was found that the width WA of the thin wire T forming the mesh pattern of the detection electrode was 4.0 µm in Example 1, 1.0 µm in Example 11, and 4.5 µm in Example 12. The evaluation grade of stretch resistance and breaking after transfer was A in all of Examples 1, 11, and 12 The evaluation grade of breaking of external connection terminals and bend resistance was B in all of Examples 1, 11, and 12. These results show that regardless of whether the width WA of the thin wire T forming the mesh pattern of the detection electrode is 1.0 µm or 4.5 µm, excellent evaluation results are obtained as in Example 1.

By the comparison between Examples 1 and 13, it was found that the type of layer to be bonded to a support was a pressure-sensitive adhesive in Example 1 and a UV-curable adhesive in Example 13: the thickness of the layer to be bonded to a support was 15 µm in Example 1 and 5 µm in Example 13; the peel adhesion between the 100 µm thick PET film and the conductive layer was 0.01 N/mm in Example 1 and 0.15 N/mm in Example 13; and the modulus of elasticity of the layer to be bonded to a support at 130° C. was 0.22 MPa in Example 1 and 0.4 MPa in Example 13. Furthermore, the evaluation grade of stretch resistance, breaking after transfer, breaking of external connection terminals, and bend resistance was B in both the Examples 1 and 13. These results show that even though the type of layer to be bonded to a support is changed to a UV-curable adhesive from a pressure-sensitive adhesive, excellent evaluation results are obtained.

By the comparison between Examples 13 and 14, it was found that the thickness of the layer to be bonded to a support was 5 µm in Example 13 and 15 µm in Example 14, and the peel adhesion between the 100 µm thick PET film and the conductive layer was 0.15 N/mm in Example 13 and 0.17 N/mm in Example 14. Furthermore, the evaluation grade of breaking after transfer and bend resistance was B in Example 13 and C in Example 14, and the evaluation grade of stretch resistance and breaking of external connection terminals was A in both the Examples 13 and 14. These evaluation results show that the thinner the layer to be bonded to a support, the further the bend resistance is improved, as in the comparison between Examples 1 and 5.

In Comparative Example 1, the modulus of elasticity of the layer to be bonded to a support at 130° C. was 0.08 MPa. Furthermore, in Comparative Example 1, the evaluation grade of stretch resistance and breaking after transfer was A, the evaluation grade of bend resistance was B, and the evaluation grade of breaking of external connection terminals was E. Presumably, in Comparative Example 1, because the modulus of elasticity of the layer to be bonded to a support at 130° C. is low, in a case where the external connection terminals and a flexible print substrate the connected to each other by a thermocompression method, the external connection terminals may be excessively displaced in the lamination direction of the conductive film for a touch sensor and thus broken.

In Comparative Example 2, the thickness of the layer to be bonded to a support was 25 µm. Furthermore, in Comparative Example 2, the evaluation grade of stretch resistance and breaking after transfer was A, the evaluation grade of breaking of external connection terminals was D, and the evaluation grade of bend resistance was E. Presumably, in Comparative Example 2, because the layer to be bonded to a support is thick, the rigidity of the layer to be bonded to a support may be high, the layer to be bonded to a support may be unable to endure the bending test performed 20 times during the evaluation of bend resistance and thus broken, and the breaking of the layer to be bonded to a support may lead to the breaking of the mesh pattern electrode and the external connection terminals.

In Comparative Example 3, the peel adhesion between the 100 µm thick PET film and the conductive layer was 0.25 N/mm. Furthermore, in Comparative Example 3, the evaluation grade of stretch resistance was A, the evaluation grade of breaking of external connection terminals and bend resistance was B, and the evaluation grade of breaking after transfer was E. Presumably, in Comparative Example 3, because the peel adhesion between the 100 µm thick PET film and the conductive layer is high, the mesh pattern electrode may be easily broken in a case where an attempt is made to peel the 100 µm thick PET film from the conductive layer.

In Comparative Example 4, the layer to be bonded to a support was a UV-curable adhesive, and the peel adhesion between the 100 µm thick PET film and the conductive layer was 0.25 N/mm. Furthermore, in Comparative Example 4, the evaluation grade of stretch resistance and breaking of external connection terminals was A, the evaluation grade of bend resistance was C, and the evaluation grade of breaking after transfer was E. Presumably, in Comparative Example 4, because the peel adhesion between the 100 µm thick PET film and the conductive layer is high, the mesh pattern electrode may be easily broken in a case where an attempt is made to peel the 100 µm thick PET film from the conductive layer, as in Comparative Example 3

The above results show that setting the peel adhesion between the 100 µm thick PET film and the conductive layer to 0.17 N/mm or less makes it possible to prevent the breaking of the mesh pattern electrode in a case where an attempt is made to peel the 100 µm thick PET film from the conductive layer, and setting the modulus of elasticity of the layer to be bonded to a support at 130° C. to 0.11 MPa or more makes it possible to prevent the breaking of the external connection terminals in a case where the external connection terminals and a flexible print substrate are connected to each other by a thermocompression method. The above results also show that setting the thickness of the layer to be bonded to a support to 15 µm or less makes it possible to impart sufficient bend resistance to the conductive film for a touch sensor, and setting the mass ratio of a polymer to silver in the silver halide-containing photosensitive layer to 0.04 or more makes it possible to impart sufficient stretch resistance to the mesh pattern electrode and the external connection terminals.

Furthermore, the above results show that using both the UV-curable adhesive and the pressure-sensitive adhesive as the layer to be bonded to a support makes it possible to obtain an excellent transfer foil for a touch sensor and an excellent conductive film for a touch sensor that can prevent the breaking of the mesh pattern electrode in a case where an attempt is made to peel the 100 µm thick PET film from the conductive layer, prevent the breaking of the external connection terminals in a case where the external connection terminals and a flexible print substrate are connected to each other by a thermocompression method, and impart sufficient stretch resistance to the mesh pattern electrode and the external connection terminals.

EXPLANATION OF REFERENCES 1,1A transfer foil for touch sensor
2,2A conductive film for touch sensor
11 temporary support
12 conductive layer
13,13A layer to be bonded to support
14 support
15 touch sensor
21 first detection electrode
22 first lead wire
23 first external connection terminal
31 second detection electrode
32 second lead wire
33 second external connection terminal
41 curable adhesive layer
42 pressure-sensitive adhesive layer
C mesh cell
MP mesh pattern
T thin wire
WA width
WB interval
X, Y direction

What is claimed is:

1. A transfer foil for a touch sensor for transferring a conductive layer to a support, the transfer foil comprising:
a temporary support;
the conductive layer disposed on a surface of the temporary support; and
a layer to be bonded to a support that is disposed on a surface of the conductive layer and consists of a pressure-sensitive adhesive layer or a curable adhesive layer,
wherein a peel adhesion between the temporary support and the conductive layer is 0.20 N/mm or less,
the layer to be bonded to a support has a thickness of 20 µm or less and a modulus of elasticity of 0.10 MPa or more at a temperature of 130° C.,
the conductive layer includes a detection electrode that has a mesh pattern formed of a thin wire consisting of a conductive member, a lead wire that consists of the conductive member and is drawn from the detection electrode, and an external connection terminal that is connected to the lead wire, and
the thin wire forming the mesh pattern of the detection electrode has a line width of 1.0 µm or more and 4.5 µm or less.

2. The transfer foil for a touch sensor according to claim 1,
wherein the layer to be bonded to a support has a modulus of elasticity of 0.15 MPa or more at a temperature of 130° C.

3. The transfer foil for a touch sensor according to claim 2,
wherein the layer to be bonded to a support has a modulus of elasticity of 0.20 MPa or more at a temperature of 130° C.

4. The transfer foil for a touch sensor according to claim 1,
wherein a content of rubber in the layer to be bonded to a support is 15% by mass or more and 45% by mass or less.

5. The transfer foil for a touch sensor according to claim 1, further comprising:
a support layer disposed on a surface of the layer to be bonded to a support,
wherein the support layer has a polyimide resin.

6. The transfer foil for a touch sensor according to claim 5, further comprising:
a hardcoat layer disposed on a surface of the support, the surface opposite to the layer to be bonded to a support.

7. The transfer foil for a touch sensor according to claim 1,
wherein the conductive member includes a conductive material and a resin material.

8. The transfer foil for a touch sensor according to claim 7,
wherein the conductive material of the conductive member is a metal material.

9. The transfer foil for a touch sensor according to claim 8,
wherein the conductive material of the conductive member is silver.

10. The transfer foil for a touch sensor according to claim 7,
wherein in the conductive member, a mass ratio of the resin material to the conductive material is 0.01 or more.

11. A transfer foil for a touch sensor for transferring a conductive layer to a support, the transfer foil comprising:
a temporary support;
the conductive layer disposed on a surface of the temporary support;

a layer to be bonded to a support that is disposed on a surface of the conductive layer and consists of a pressure-sensitive adhesive layer or a curable adhesive layer;

a support layer disposed on a surface of the layer to be bonded to a support, the support layer having a polyimide resin; and a hardcoat layer disposed on a surface of the support, the surface opposite to the layer to be bonded to a support, wherein a peel adhesion between the temporary support and the conductive layer is 0.20 N/mm or less, the layer to be bonded to a support has a thickness of 20 μm or less and a modulus of elasticity of 0.20 MPa or more at a temperature of 130° C., a content of rubber in the layer to be bonded to a support is 15% by mass or more and 45% by mass or less, the conductive member includes a conductive material and a resin material, in the conductive member, a mass ratio of the resin material to the conductive material is 0.01 or more, the conductive material of the conductive member is silver, the conductive layer includes a detection electrode that has a mesh pattern formed of a thin wire consisting of a conductive member, a lead wire that consists of the conductive member and is drawn from the detection electrode, and an external connection terminal that is connected to the lead wire, and the thin wire forming the mesh pattern of the detection electrode has a line width of 1.0 μm or more and 4.5 μm or less.

12. A method for manufacturing a conductive film for a touch sensor, comprising:

bonding the layer to be bonded to a support in the transfer foil for a touch sensor according to claim 1 to a surface of the support; and peeling the temporary support from the conductive layer.

13. A method for manufacturing a conductive film for a touch sensor, comprising:

bonding the layer to be bonded to a support in the transfer foil for a touch sensor according to claim 11 to a surface of the support; and peeling the temporary support from the conductive layer.

* * * * *